United States Patent
Carbone et al.

(10) Patent No.: US 10,968,966 B2
(45) Date of Patent: Apr. 6, 2021

(54) BRAKE MECHANISM FOR SPHERICAL WHEEL

(71) Applicant: Intuitive Surgical Operations, Inc., Sunnyvale, CA (US)

(72) Inventors: Joseph Carbone, San Jose, CA (US); Stefan Geiger, Union City, CA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 62 days.

(21) Appl. No.: 16/191,267

(22) Filed: Nov. 14, 2018

(65) Prior Publication Data
US 2019/0145471 A1  May 16, 2019

Related U.S. Application Data

(60) Provisional application No. 62/586,411, filed on Nov. 15, 2017.

(51) Int. Cl.
| | | |
|---|---|---|
| *B60B 33/08* | (2006.01) | |
| *F16D 49/10* | (2006.01) | |
| *B60B 19/14* | (2006.01) | |
| *F16D 65/14* | (2006.01) | |
| *F16D 49/00* | (2006.01) | |
| *B60K 7/00* | (2006.01) | |

(Continued)

(52) U.S. Cl.
CPC .............. *F16D 49/10* (2013.01); *B60B 19/14* (2013.01); *F16D 49/00* (2013.01); *F16D 65/14* (2013.01); *B60B 33/08* (2013.01); *B60K 7/0007* (2013.01); *B60K 2007/0038* (2013.01); *B60K 2007/0092* (2013.01); *B60Y 2200/62* (2013.01); *F16D 2121/20* (2013.01); *F16D 2121/24* (2013.01); *F16D 2125/68* (2013.01)

(58) Field of Classification Search
CPC ......... B60B 19/14; B60B 33/08; F16D 49/10; F16D 49/00; F16D 65/14; F16D 2121/20; F16D 2125/68; F16D 2121/24; B60K 7/0007; B60K 2007/0092; B60K 2007/0038; B60Y 2200/62
USPC ...................................... 180/7.1, 210; 16/24
See application file for complete search history.

(56) References Cited

U.S. PATENT DOCUMENTS 2,687,546 A * 8/1954 Oppenheimer ......... B60B 33/08
                                                            16/26
4,203,177 A * 5/1980 Kegg ...................... B60B 33/08
                                                            16/24

(Continued)

OTHER PUBLICATIONS

Vertut, Jean and Phillipe Coiffet, Robot Technology: Teleoperation and Robotics Evolution and Development, English translation, Prentice-Hall, Inc., Inglewood Cliffs, NJ, USA 1986, vol. 3A, 332 pages.

*Primary Examiner* — Toan C To
(74) *Attorney, Agent, or Firm* — IP Spring

(57) ABSTRACT

Implementations relate to a brake mechanism for a spherical wheel. In some implementations, a wheel mechanism includes a spherical wheel and a base coupled to the spherical wheel via a rotary bearing contacting a surface of the spherical wheel, where the rotary bearing is configured to allow the spherical wheel to rotate. The wheel mechanism includes a brake ring coupled to the base and configured to selectively engage and disengage the surface of the spherical wheel, where the brake ring provides friction opposing rotation of the spherical wheel when engaged.

23 Claims, 8 Drawing Sheets

(51) Int. Cl.
*F16D 121/24* (2012.01)
*F16D 121/20* (2012.01)
*F16D 125/68* (2012.01)

(56) References Cited

U.S. PATENT DOCUMENTS

| | | | |
|---|---|---|---|
| 4,402,108 A * | 9/1983 | Pannwitz | B60B 33/08 16/26 |
| 4,413,693 A | 11/1983 | Derby | |
| 5,057,728 A * | 10/1991 | Dammeyer | B66F 9/07509 188/171 |
| 5,906,247 A * | 5/1999 | Inoue | B60B 19/14 180/20 |
| 5,950,749 A * | 9/1999 | Inoue | A61G 5/046 180/7.1 |
| 6,888,333 B2 | 5/2005 | Laby et al. | |
| 7,578,028 B2 * | 8/2009 | Sellars | B60B 33/08 16/20 |
| 7,847,504 B2 | 12/2010 | Hollis et al. | |
| 8,453,811 B2 | 6/2013 | Lewis et al. | |
| 8,459,383 B1 | 6/2013 | Burget et al. | |
| 8,827,879 B2 * | 9/2014 | Nicholas | A63B 21/0004 482/132 |
| 9,174,338 B2 | 11/2015 | Ouellet | |
| 9,199,117 B1 * | 12/2015 | Nicholas | A63B 21/0004 |
| 9,211,015 B2 * | 12/2015 | Larzelere | A47C 7/006 |
| 9,427,649 B2 | 8/2016 | Teevens et al. | |
| 9,783,001 B1 | 10/2017 | Panter | |
| 10,099,512 B2 * | 10/2018 | Hsieh | B60B 33/045 |
| 10,668,771 B2 | 6/2020 | Cherian et al. | |
| 2006/0131110 A1 * | 6/2006 | Chung | B60B 33/0057 188/29 |
| 2008/0167160 A1 | 7/2008 | Koike | |
| 2008/0283311 A1 | 11/2008 | Li | |
| 2010/0243342 A1 | 9/2010 | Wu et al. | |
| 2013/0257138 A1 | 10/2013 | Chang et al. | |
| 2016/0333953 A1 | 11/2016 | Lewis et al. | |
| 2017/0354468 A1 | 12/2017 | Johnson et al. | |
| 2018/0022197 A1 | 1/2018 | Bewley et al. | |
| 2018/0093863 A1 | 4/2018 | Hawkins et al. | |
| 2018/0319215 A1 | 11/2018 | Sharp et al. | |
| 2019/0144036 A1 * | 5/2019 | Geiger | B62D 11/003 180/6.5 |

* cited by examiner

BRAKE MECHANISM FOR SPHERICAL WHEEL

CROSS-REFERENCE TO RELATED APPLICATIONS

The present application claims priority to U.S. Provisional Patent Application No. 62/586,411, filed Nov. 15, 2017 and titled "Brake Mechanism for Spherical Wheel," the entire contents of which are hereby incorporated by reference.

BACKGROUND

Wheel systems use wheels to support and move loads more easily across ground surfaces and to particular physical locations. Some wheel systems are wheel drive systems that can drive the wheels with motors to move the load under motorized and/or user control. In some examples, casters can be provided on the bottom of an object or a cart supporting a load, where the wheels of the caster allow the object to be rolled over the ground and can be driven by motors connected to the wheels. Some wheel drive systems may use a spherical wheel that can roll in multiple directions. For example, driven rollers such as omni wheels may contact the spherical wheel to drive it in particular directions.

Some wheel systems include holding or brake mechanisms that cause the wheel system and its carried load to remain stationary at a particular location. For example, wheel systems can include a brake mechanism that selectively forces a brakepad against the wheel of the caster to prevent further rolling of the wheel, thus locking the location of the load at a particular location.

Some wheel systems are desired to be highly stable so that the load carried by the wheel system does not have accidental or unintended motion, e.g., when the load is stationary after it has been moved into a particular location. One example of a load requiring stability is a slave device used in a teleoperated surgical system, which is used to provide teleoperated surgery on a patient. A surgeon typically operates a master controller to remotely control (e.g., telemanipulate) the motion and functions of surgical instruments in the slave device at the surgical site. Teleoperated slave devices that include the surgical instruments can be moved to a location near a patient in an operating room using a wheel system and held stationary at that location during a medical procedure. The teleoperated slave devices can be held in that location using a locking mechanism of the wheel system, e.g., brakes applied to casters and/or additional feet that are extended to contact the ground.

However, some wheel systems may allow unintended motion of the carried load. For example, casters, spherical wheels, and other wheel systems typically have backlash and play in the components of the wheel mechanisms, which allows the carried load to vibrate, wobble, or otherwise move in small amounts even when the wheel system is held stationary at a location. For example, casters typically can swivel, and the components allowing this motion may allow the carried load to sway or be nudged unintentionally when moved or stationary. Spherical wheel systems may have backlash and play in the omni wheels and connecting mechanisms, thus causing backlash in the contact path from the omni wheel to the spherical wheel and causing instability in the load during movement or when stationary. In addition, brake systems may use brakepads that may slide and allow wheels to move, e.g., if heavy loads are being supported.

Such unintended motion in the load of a wheel system can be dangerous, e.g., if the load is a medical device that depends on stability during medical procedures in which contact is made with a patient, such as teleoperated surgical devices. In addition, providing additional stability mechanisms in such wheel systems, such as adding retractable feet at a stationary position, adds to the cost of the wheel systems and devices.

SUMMARY

Implementations of the present application relate to a brake mechanism for a spherical wheel. In some implementations, a wheel mechanism includes a spherical wheel and a base coupled to the spherical wheel via a rotary bearing contacting a surface of the spherical wheel, where the rotary bearing is configured to allow the spherical wheel to rotate. The wheel mechanism includes a brake ring coupled to the base and configured to selectively engage and disengage the surface of the spherical wheel, where the brake ring provides friction opposing rotation of the spherical wheel when engaged.

Various implementations and examples of the wheel mechanism are described. For example, in some implementations, the brake ring is configured to apply a greater amount of friction to the rotation of the spherical wheel when engaged than when disengaged. In some implementations, the brake ring is positioned to retain the spherical wheel in a space in proximity to the base, the brake ring positioned on a side of the spherical wheel opposite to the base. In some implementations, the brake ring is configured to contact the spherical wheel at a plurality of contact edges of the brake ring spaced around the brake ring, where the contact edges are separated by non-contacting edges of the brake ring positioned between the contact edges. For example, the brake ring includes a toroid having a hole in a center of the brake ring in which the spherical wheel is positioned, where the contact edges are spaced from each other about an inner circumference of the brake ring. In some implementations, the brake ring is selectively engagable with the spherical wheel on a first hemispherical portion of the spherical wheel that is opposite to a second hemispherical portion of the spherical wheel contacted by the rotary bearing.

In further implementations of the wheel mechanism, the brake ring is engaged with the surface of the spherical wheel in an engaged position in which the brake ring applies a first friction to the rotation of the spherical wheel, and the brake ring is disengaged with the surface of the spherical wheel in a disengaged position in which the brake ring applies no friction to the rotation of the spherical wheel. In some implementations, the brake ring is configured to move from a disengaged position in a direction toward the base to engage the surface of the spherical wheel. In some examples, the brake ring is configured to move in a direction perpendicular to a ground surface on which the spherical wheel is positioned.

In some implementations, the wheel mechanism further includes at least one actuator coupled to the base and configured to move the brake ring with respect to the spherical wheel and to disengage the brake ring from the surface of the spherical wheel. In some implementations, the brake ring is coupled to the base by a plurality of connection members oriented in parallel and translatable to selectively engage and disengage the brake ring with the surface of the spherical wheel. In some examples, an actuator is coupled to the base and is coupled to the connection members via a linkage, the actuator configured to translate the connection members to cause the brake ring to engage and disengage the surface of the spherical wheel.

In further implementations, the rotary bearing of the wheel mechanism includes a ball provided in a ball transfer unit and rotatable with respect to the base, where the ball is configured to contact the surface of the spherical wheel during rotation of the spherical wheel on a ground surface. In some implementations, the rotary bearing is one of a plurality of rotary bearings, where the base is coupled to the spherical wheel via the plurality of rotary bearings contacting the surface of the spherical wheel and configured to allow the spherical wheel to rotate. In some implementations, the wheel mechanism further includes an omni wheel coupled to the base and engaged with a surface of the spherical wheel, and an actuator coupled to the base and to the omni wheel, where the actuator is configured to rotate the omni wheel to cause rotation of the spherical wheel.

In some implementations, a wheel system includes a chassis, and a plurality of wheel modules coupled to the chassis. One or more wheel modules of the plurality of wheel modules each include a spherical wheel, and a base coupled to the spherical wheel via a rotary bearing that contacts a surface of the spherical wheel, where the rotary bearing configured to allow the spherical wheel to rotate. Each of the one or more wheel modules includes a brake ring coupled to the base, where the brake ring is configured to selectively engage and disengage the surface of the spherical wheel, and where the brake ring provides a greater amount of friction to the rotation of the spherical wheel when engaged than when disengaged.

Various implementations and examples of the wheel system are described. In some implementations, in each of the one or more wheel modules, the brake ring is positioned to retain the spherical wheel in a space in proximity to the base, the brake ring positioned on a side of the spherical wheel opposite to the base. In some implementations, in each of the one or more wheel modules, the brake ring is configured to contact the spherical wheel at a plurality of contact edges of the brake ring spaced around the brake ring, where the contact edges are separated by non-contacting edges of the brake ring positioned between the contact edges. In some implementations, in each of the one or more wheel modules, the rotary bearing is one of a plurality of rotary bearings, each rotary bearing including a ball provided in a ball transfer unit and configured to contact the surface of the spherical wheel and rotate with respect to the base, where the base is coupled to the spherical wheel via the plurality of rotary bearings contacting the surface of the spherical wheel and configured to allow the spherical wheel to rotate. In some implementations, in each of the one or more wheel modules, the brake ring is coupled to the base by one or more connection members translatable to selectively engage and disengage the brake ring with the surface of the spherical wheel, where an actuator is coupled to the base and is coupled to the connection members via a linkage, and where the actuator is configured to translate the connection members to cause the brake ring to engage and disengage the surface of the spherical wheel.

In some implementations, a method to control braking a wheel mechanism includes providing a spherical wheel supporting a chassis via a rotary bearing, and engaging a brake ring with the spherical wheel on a first hemispherical portion of the spherical wheel that is opposite to a second hemispherical portion of the spherical wheel engaged by the rotary bearing, where the engaging causes friction to rotation of the spherical wheel. The method includes disengaging the brake ring from the spherical wheel, which reduces friction to the rotation of the spherical wheel. Various implementations and examples of the method are described. For example, in some implementations, disengaging the brake ring from the spherical wheel includes translating the brake ring in a direction opposite to the chassis.

DETAILED DESCRIPTION

Figure 1:
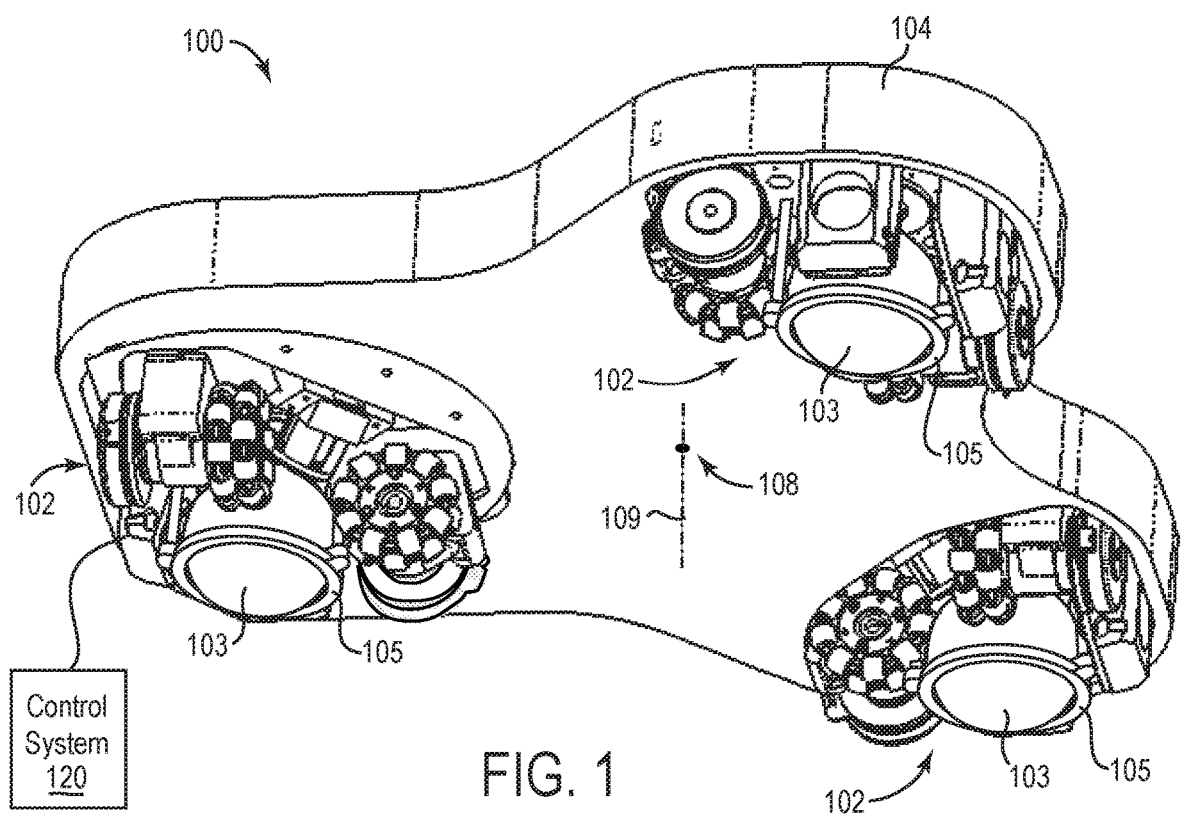
FIG. 1 is a bottom perspective view of an example wheel drive system, according to some implementations.

Implementations relate to a brake mechanism for a spherical wheel. A wheel mechanism includes a spherical wheel and a base coupled to the spherical wheel via one or more rotary bearings contacting a surface of the spherical wheel. A brake ring is coupled to the base and can be controlled to selectively engage and disengage the surface of the spherical wheel. The brake ring provides friction opposing rotation of the spherical wheel when the brake ring is engaged with the spherical wheel, and provides less friction (e.g., no friction) when the brake ring is disengaged from the spherical wheel.

Various features of the brake mechanism are described. In some examples, the rotary bearing(s) can be ball transfer units having a ball that contacts the spherical wheel and allows the spherical wheel to rotate. In some examples, the brake ring is positioned is positioned on a side of the spherical wheel opposite to the base and retains the spherical wheel in a space in proximity to the base. For example, the brake ring can selectively engage the spherical wheel on a first hemispherical portion of the spherical wheel that is opposite to a second hemispherical portion of the spherical wheel contacted by the rotary bearing(s). In some implementations, the brake ring contacts the spherical wheel at multiple contact edges spaced around the brake ring and that are separated by non-contacting edges of the brake ring positioned between the contact edges. In some examples, the brake ring includes a toroid having a hole in a center of the brake ring in which the spherical wheel is positioned, where the contact edges are spaced from each other about an inner circumference of the brake ring.

In some implementations, the brake ring is configured to move between an engaged position and a disengaged position in directions perpendicular to a ground surface on which the spherical wheel is positioned. For example, the wheel mechanism can include at least one actuator coupled to the base that is controlled to move connection members coupled to the brake and move the brake ring to the engaged and disengaged positions with respect to the spherical wheel. For example, a single actuator can move the connection members via a linkage. In some example implementations, multiple rotary bearings (e.g., ball transfer units) contact the surface of the spherical wheel and allow the spherical wheel to rotate. In some examples, the spherical wheel mechanism includes an omni wheel coupled to the base and engaged with a surface of the spherical wheel, and an actuator coupled to the base and omni wheel which can rotate the omni wheel to cause rotation of the spherical wheel.

Various implementations of a brake mechanism described herein provide various benefits. For example, the brake ring can be coupled directly to a chassis carried by the spherical wheel which allows the spherical wheel to be locked to the chassis. This provides stability since it locks the entire wheel mechanism, with no backlash provided in the braking system. Thus, more stable and strong braking to the spherical wheel are provided, allowing the carried chassis and load to be more stably affixed to the ground at a particular location. In contrast, prior wheel systems such as casters include backlash between components of the mechanism, even in a braked state. In further examples, many prior braking systems provide braking via a drive mechanism that may include backlash, since not all of the mechanisms in the drive train are locked by the brakes (e.g., gearbox, motor, omni wheel rollers, etc.). In further examples, some prior braking systems provide braking via brake pads forced against a rotating wheel which may provide backlash due to sliding of the brakepads with respect to the wheel.

Furthermore, the brake ring of the described braking mechanism can help constrain the position of the spherical wheel to its rotating position by acting as a retainer. For example, if the spherical wheel is moved over a gap or ledge in which the ground surface falls away, the spherical wheel does not fall out of its rotating position significantly since it is caught by the brake ring positioned underneath it, allowing the spherical wheel to be easily restored to its rotating position when it is moved back onto a ground surface. In addition, the described braking system can include features such as a central actuator connected to multiple connection members by a linkage, where the connection members are connected to the brake ring. This allows synchronized movement of the connection members and steady and level movement of the brake ring with respect to the spherical wheel.

Furthermore, rotary bearings such as ball transfer units in the described wheel system can provide a controlled load path to the spherical wheel, providing a more rigid system. The ball transfer units provide a direct path for the force of the load carried by the wheel mechanism to the spherical wheel, such that a drive mechanism need not carry a significant portion of the load. This reduces the backlash in the load paths since the backlash in the drive mechanism does not significantly affect the load. The ball transfer units can contact the surface of the spherical wheel at positions that function in conjunction with the brake ring to constrain the spherical wheel to its rotating position at which a drive mechanism can engage the spherical wheel.

Various terms including "linear," "center," "parallel," "perpendicular," "aligned," or particular measurements or other units as used herein can be approximate, need not be exact, and can include typical engineering tolerances.

Figure 2:
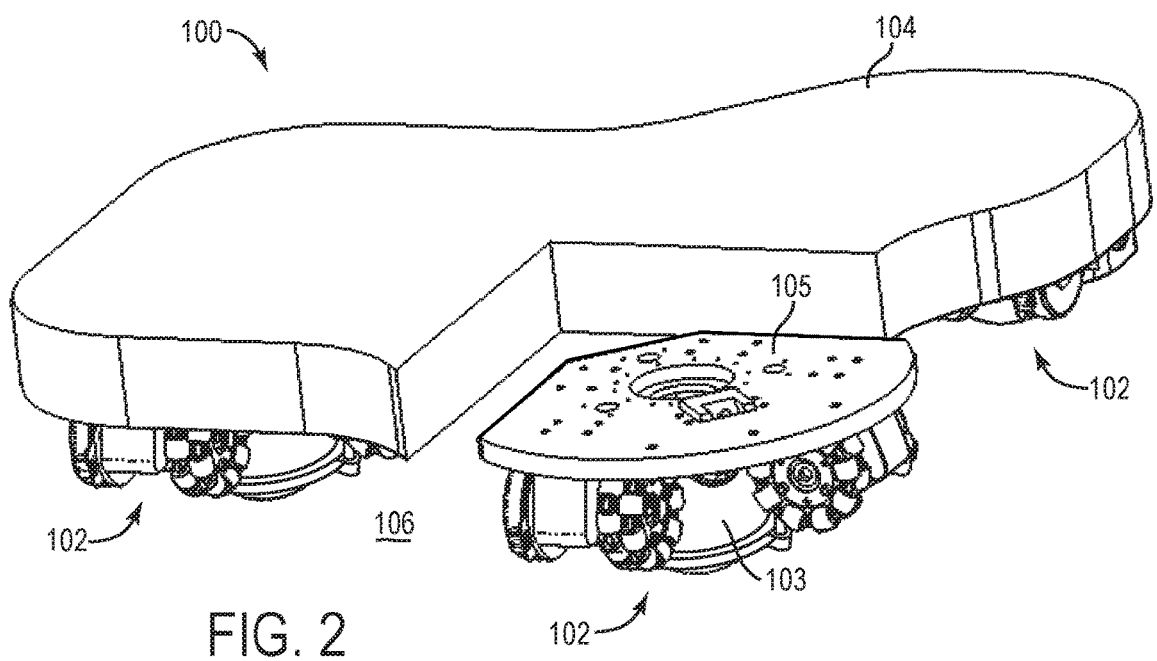
FIG. 2 is a top perspective view of the example wheel drive system of FIG. 1, according to some implementations.

FIG. 1 is a bottom perspective view of an example wheel drive system 100 from below the wheel drive system 100, according to some implementations. FIG. 2 is a top perspective view of the wheel drive system 100 from above portions of the wheel drive system 100.

Wheel drive system 100 includes multiple wheel modules 102 that are positioned under a chassis 104, which can also be referred to as a frame or load object herein. In this example, the wheel modules 102 are positioned under and support the chassis 104. The wheel modules 102 each include a spherical wheel 103 that contacts the ground surface 106 (see FIG. 2) and supports the chassis 104. A spherical wheel 103 is operative to rotate within its associated wheel module 102 while bearing the chassis 104. This allows the wheel modules 102 to be rolled across the ground surface 106 while bearing chassis 104, thus allowing the wheel drive system 100 to be moved.

As shown in FIG. 2, in some implementations each wheel module 102 can be coupled to an associated base 105 that supports the components of that wheel module 102. Base 105 is coupled to the bottom surface of the chassis 104. In other implementations, each wheel module 102 can be coupled directly to the bottom surface of chassis 104 or other object, which can act as the base for the wheel module 102.

In various examples, the chassis 104 can be part of, or can carry, one or more objects. In some example implementations, the chassis 104 can be part of a medical device that can perform medical operations, and which can be rolled on the ground using wheel modules 102 to a location in which it is used to perform a medical procedure. For example, chassis 104 can be a teleoperated slave surgical device that includes surgical instruments that operate on a patient or simulated surgical site. Other objects or equipment can alternatively be carried by or included in the chassis 104. In some implementations, the chassis 104 is a cart, e.g., a structure that can bear a load object such as a medical device or other object. For example, chassis 104 can be a flat cart, a container, a basket, or other structure can be provided which can contain or hold a load of one or more additional load objects.

In some implementations, one or more of the wheel modules 102 can be controlled to drive its spherical wheel 103 in one or more directions based on a drive mechanism of the wheel module 102. For example, in some implementations, a spherical wheel 103 can be driven by an omni wheel that is driven by an actuator, e.g., a motor or other type of actuator that outputs an active force (referred to as a motor herein). In various implementations, one or more omni wheels can drive a particular spherical wheel 103. Some examples of drive mechanisms are described below with respect to FIGS. 8 and 9.

One or more of the wheel modules 102 each includes a respective brake mechanism that allows friction to be applied to the spherical wheel 103 of that wheel module. In some implementations, each wheel module 102 of the system 100 includes a brake mechanism. The brake mechanism includes a brake ring 105 that contacts the spherical wheel 103 to provide the friction. In some examples, the control system 120 (described below) or other controller can be used to activate the brake mechanism of each wheel module, e.g., individually control the brake mechanism of each wheel module 102, or control the brake mechanisms of all the wheel modules 102 simultaneously. In some implementations, the brake mechanism can be used with wheel modules that are each driven by an actuator. In other implementations, the brake mechanism can be used in a wheel module that is not driven by an actuator and is, for example, rolled across the ground surface by an external force (e.g., a person or vehicle). Examples of a brake mechanism are described below.

In the example of FIG. 1, three wheel modules 102 are coupled to the bottom of the chassis 104. The use of three wheel modules 102 ensures that all of the spherical wheels 103 of the wheel modules 102 contact the ground 106. In some examples, the wheel modules 102 can be spaced equally (or approximately equally) from each other around a center control point 108 of the wheel drive system 100 and approximately within a plane.

In some examples, the wheel drive system 100 can be driven in any direction along the ground 106. For example, in some implementations, each wheel module 102 can be driven in a different particular direction, and a combination of driven motion directions from multiple of the wheel modules 102 can be controlled to drive the wheel drive system and chassis 104 in any desired direction. In some examples, three wheel modules 102 are spaced regularly around an axis 109 that extends through the control point 108 and is perpendicular to a bottom surface of the chassis, e.g., perpendicular to ground surface 106. For example, each wheel module 102 can be spaced equally about control point 108, e.g., about 120 degrees from each of the other two wheel modules 102 in an angular measurement around axis 109. In other implementations, different spacings between the wheel modules 102 can be used, e.g., where two of the wheel modules 102 are closer to each other than to a third wheel module 102. The contact points of the spherical wheels of the wheel modules 102 with the ground form a single plane. In some implementations, the wheel modules 102 are coupled to a bottom surface of a chassis that approximately defines a plane.

In this example, each wheel module 102 can be driven by an actuator in a particular driven direction (as described in greater detail below), where each wheel module is driven in a different direction from the other wheel modules 102. The wheel drive system 100 can be rotated and/or translated in a particular direction by controlling the actuators with different amounts of force to sum to a movement vector in the desired angle and/or direction. In some implementations, two actuators can be associated with each of one or more of the spherical wheels 103, and the two actuators can be controlled to drive a single spherical wheel 103 in two different directions. The two actuators can be controlled simultaneously to drive the associated spherical wheel 103 in a direction resulting from a combination of the two different directions.

In other implementations, a different number of wheel modules can be used, e.g., four, five, etc., which can be similarly spaced equally about the center control point 108 in some examples. In some implementations, the wheel modules 102 can be positioned at midpoints or corners of sides of a bottom surface of chassis 104. In some implementations, one or more of the wheel modules 102 can be irregularly spaced around the control point 108, e.g., at particular positions along the sides of a bottom surface of chassis 104.

A control system 120 can be included in wheel drive system 100 in some implementations to provide control signals to motors of the drive system 100 to control a speed and direction of the driven motion of the drive system 100.

Control system 120 is in communication with the wheel modules 120. In some implementations, control system 120 can also or alternatively provide signals to control the braking mechanisms of drive system 100, e.g., apply or release the brake ring 105 of the brake mechanism of each wheel module 102. In various implementations, the control system 120 can be located on a component of the wheel drive system 100 (e.g., on the chassis 104, or on one or more wheel modules 102), or can be located separate from the wheel drive system 100 and communicate with the drive system 100, e.g., via wired or wireless signals. In some examples, control system 120 can include processing circuitry (e.g., a microprocessor or other circuit) and be responsive to input commands from a user, which can be input via an input device such as buttons, a keyboard, joystick, etc. to command a direction of motion of the drive system 100 and/or to command one or more of the brake mechanisms of the wheel modules 102.

In some implementations, some of the wheel modules 102 in the wheel drive system 100 are actively driven by actuators, while one or more other wheel modules 102 are passive and do not include actuators to actively drive their spherical wheels. In some implementations, a subset of the wheel modules 102 in the wheel drive system 100 are wheel modules having a spherical wheel, and the other modules 102 can be different types of wheel systems, e.g., casters that are actively driven with actuators or passively roll without being driven by actuators. In some example implementations, at least three wheel modules are provided, with at least one wheel module being a spherical wheel module with an actuator as described herein and other wheel modules each including a passive wheel that is not driven by an actuator.

Figure 3:
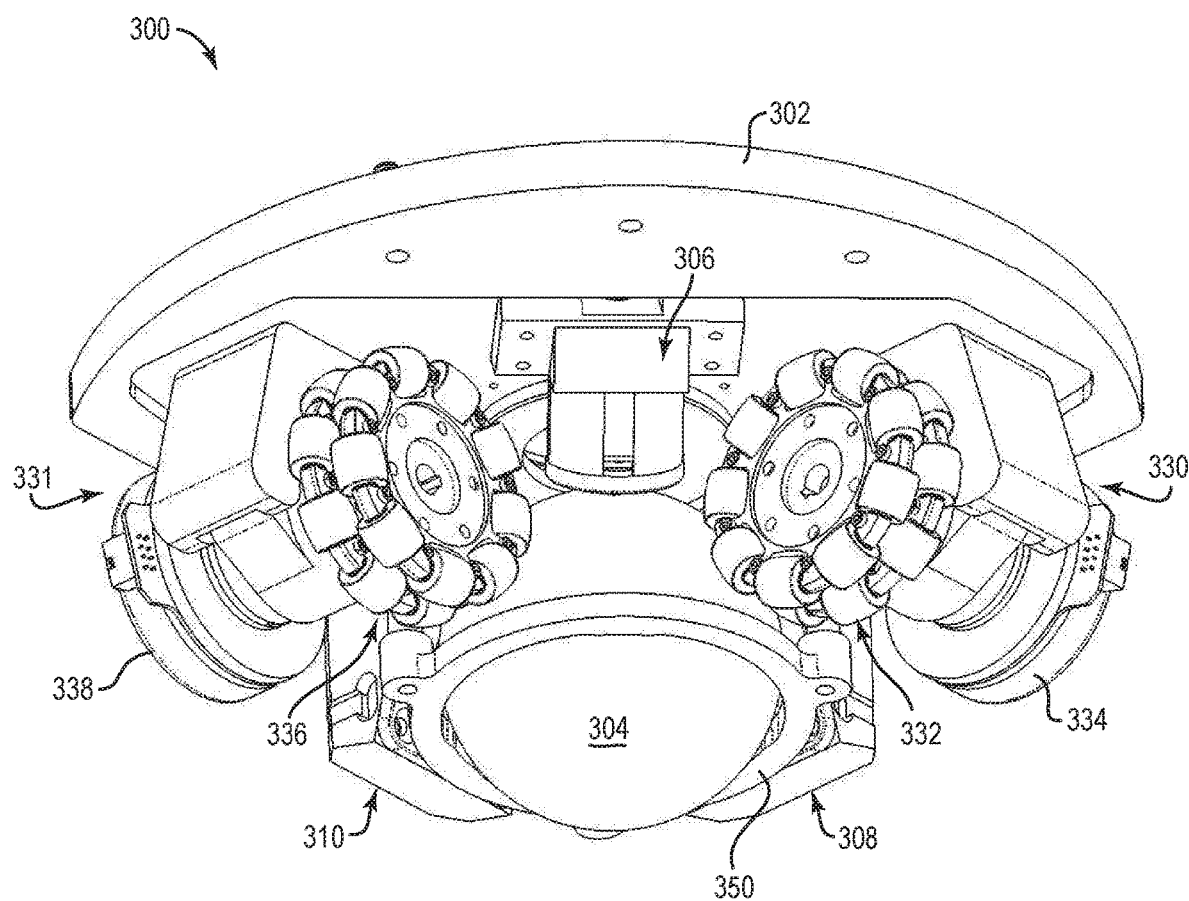
FIG. 3 is a perspective view of an example wheel module, according to some implementations.

FIG. 3 is a perspective view of an example wheel module 300 used in a wheel system and which includes a brake mechanism, according to some implementations. For example, wheel module 300 can be used as one or more of the wheel modules 102 of wheel drive system 100 of FIG. 1. Wheel module 300 can be directly coupled to one or more bottom surfaces of a chassis, e.g., chassis 104 of FIG. 1.

Wheel module 300 includes a base 302 (e.g., chassis), which can be a plate or other support separate from and coupled to a chassis in this example. In some implementations, the base 302 is the bottom surface of chassis 104, e.g., a load object or cart as described with respect to FIG. 1.

A spherical wheel 304 is positioned in a space near to the base 302 and not in contact with the base 302. The spherical wheel 304 can be the same or similar to the spherical wheels 103 described above for FIG. 1. Spherical wheel 304 can have a surface that is at least partially compliant or flexible, e.g., to allow traction with one or more rollers (e.g., omni wheels) that contact the surface of the spherical wheel. In some examples, spherical wheel 304 can be made of a polyurethane material, or can be made of a rigid material (e.g., steel) and covered in a more compliant coating, e.g., a urethane coating.

Wheel module 300 includes rotary bearings provided between the base 302 and the spherical wheel 304, where the rotary bearings assist in constraining the spherical wheel 304 to roll within a rotating space (rolling space) defined by the rotary bearings, omni wheels, and/or brake mechanism. In addition, the rotary bearings provide a path for the weight of a load carried by base 302 directly to the spherical wheel 304, e.g., the rotary bearings transfer most of the weight of the carried load from the base 302 to the spherical wheel 304.

In described implementations, the rotary bearings are ball transfer units 306, 308, and 310 that are directly coupled to base 302 and contact the surface of spherical wheel 304. The ball transfer units 306, 308, and 310 are positioned at least partially over the spherical wheel 304. Example implementations of ball transfer units 306, 308, and 310 and their configuration are described in greater detail below with respect to FIGS. 8 and 9. In some implementations, ball transfer units 306, 308, and 310 are not used and omni wheels of drive mechanisms can be considered the rotary bearings that provide the load path between base 302 and spherical wheel 304 and restrain the spherical wheel in its rotating space.

In some implementations, one or more drive mechanisms can be included in wheel module 300. In this example, two drive mechanisms are provided, first drive mechanism 330 and second drive mechanism 331 that are coupled to the base 302. Drive mechanism 330 includes a first omni wheel 332 that is connected to an actuator, e.g., first motor 334. In this example, the first omni wheel 332 contacts the surface of the spherical wheel 304 and is connected to and driven by a rotating shaft of the first motor 334. First omni wheel 332 is biased against the surface of the spherical wheel 304 by a spring force, as described in greater detail below.

Second drive mechanism 331 is similar to first drive mechanism 330, and includes a second omni wheel 336 that is connected to a second actuator, e.g., second motor 338. In this example, the second omni wheel 336 contacts the surface of the spherical wheel 304 and is connected to and driven by a rotating shaft of the second motor 338. Second omni wheel 336 is biased against the surface of the spherical wheel 304 by a spring force, as described in greater detail below. In this example, the second omni wheel 338 rotates about an axis that is approximately within a same plane and 90 degrees offset from an axis of rotation of first omni wheel 334.

Figure 4:
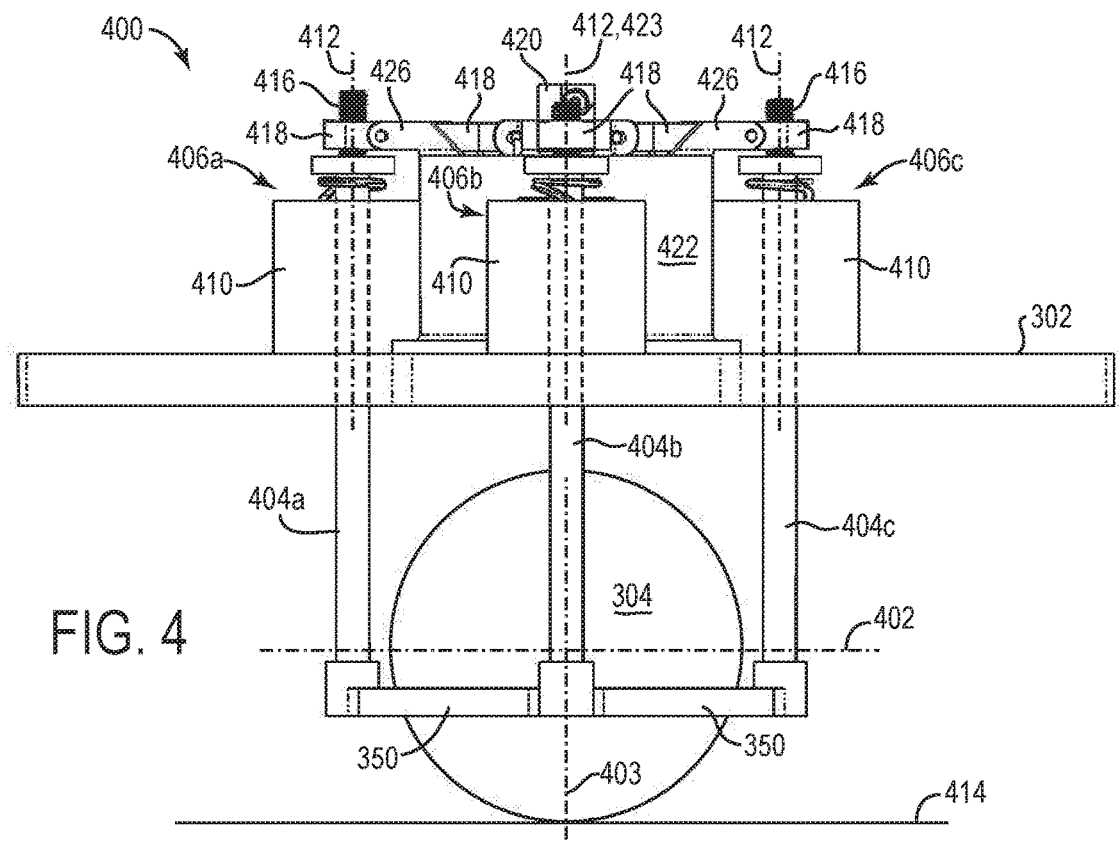
FIG. 4 is a side elevation view of an example implementation of a brake mechanism that can be used with a spherical wheel and configured in an engaged position, according to some implementations.
Figure 5:
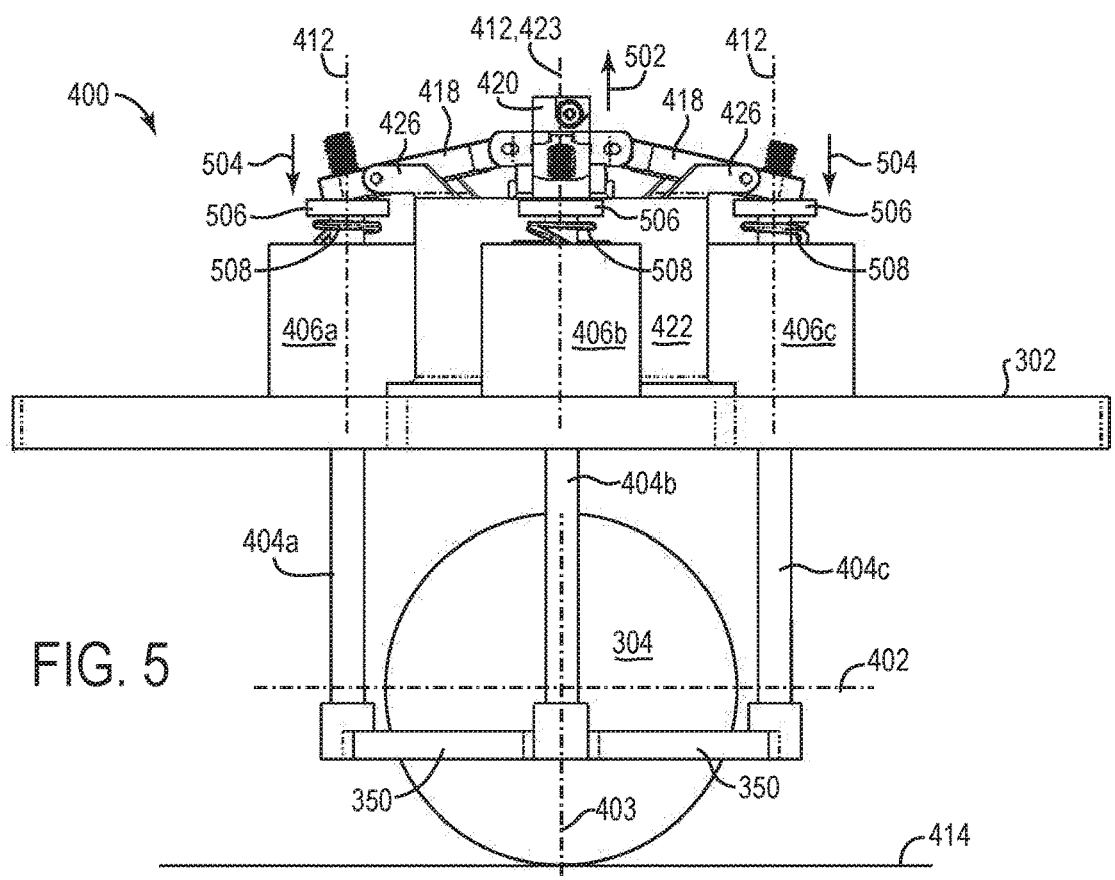
FIG. 5 is a side elevation view of the wheel module of FIG. 4 where the brake mechanism is moved to a disengaged position, according to some implementations.

A brake ring 350 is positioned on an opposite side of the spherical wheel 304 to the base 302 and is coupled to the base 302 by connection members (shown in FIGS. 4, 5, and 6). Brake ring 350 can selectively engage with (e.g., increase contact with) the surface of the spherical wheel 304 to cause friction in the rotation of the spherical wheel, and can selectively disengage from (e.g., reduce contact with) the surface of the spherical wheel 304 to reduce or remove friction in the rotation of the spherical wheel. In this example implementation, the spherical wheel 304 is at least partially positioned within a center hole of the brake ring when the spherical wheel 304 is positioned on a ground surface and bears the load of the wheel module 300, chassis, and carried load.

In some examples, the brake ring engages the surface of the spherical wheel 304 on a first hemispherical portion of the spherical wheel that is opposite to a second hemispherical portion of the spherical wheel contacted by the rotary bearings 306, 308, and 310. The first and second hemispherical portions can be defined based on a plane that intersects the center of the spherical wheel 304 and which is parallel to the bottom surface of the base 302 and/or to a ground surface on which the spherical wheel is positioned (e.g., ground surface 106 of FIG. 1).

Brake ring 350 can be or include a toroid having a hole in its center in which the spherical wheel 304 is positioned. For example, the toroid can be a rectangle that is rotated around an axis parallel to one of the edges of the rectangle. This creates an inner edge to the brake ring 350, and at least part of this inner edge is contacted with the surface of the spherical wheel 304 to engage the wheel. An example implementation of the brake ring 350 is described below with reference to FIG. 7.

The connection members connect brake ring 350 to a brake activation mechanism that is coupled to the base 302, some examples of which are detailed below. The connection members raise and lower brake ring 350 with respect to the base 302 and the spherical wheel 304 while the spherical wheel is positioned on a ground surface, to cause engagement and disengagement, respectively, of the brake ring with the spherical wheel. Raising and lowering in this example indicates moving the brake ring 350 closer and further from the base 302, respectively. For example, the spherical wheel 304 can rotate without contact and without friction from the brake ring 350 if the brake ring is lowered sufficiently to not be in contact with the spherical wheel 304. Similarly, the brake ring 350 can be raised toward the base 302 to contact the spherical wheel 304 and cause friction opposing its rotation.

Brake ring 350 is positioned to retain, and/or assist in the constraining and/or retaining of, the spherical wheel 304 in its rotating space in proximity to the base 302 and the ball transfer units 306, 308, and 310. For example, if the spherical wheel 304 is forced to a perimeter of its rotating space, the spherical wheel 304 will contact an inner edge of the brake ring 350, preventing further movement out of the rotating space. In another example, in its disengaged position, the brake ring 350 is positioned below and, e.g., out of contact with the spherical wheel to allow the wheel to rotate. If the spherical wheel moves over a gap or ledge in which the ground surface no longer supports the spherical wheel 304 (e.g., a gap in a floor, edge of a stair, etc.), the spherical wheel falls down a small distance due to gravity before being caught by the brake ring 350 positioned underneath it, where the brake ring holds the wheel in a position that is aligned with the ball transfer units 306, 308, and 310. When the spherical wheel is moved back onto a ground surface, the spherical wheel is moved back up into contact with ball transfer units 306, 308, and 310 and is restored to its operating rotating position. The retaining of the brake ring can thus act in conjunction with the constraints provided by the rotary bearings 306, 308, and 310 to maintain the spherical wheel 304 in its rotating space during movement of the wheel module 300.

FIGS. 4 and 5 are side elevation views of an example implementation of a brake mechanism 400 that can be used with a spherical wheel, according to some implementations. For example, brake mechanism 400 can be used in the wheel module 300 of FIG. 3 in some implementations. In this example, some elements shown in FIGS. 4 and 5 refer to elements of FIG. 3. FIG. 4 shows the brake mechanism 400 in a first position or first state, e.g., an engaged position in which the brake mechanism applies a greater amount of friction that opposes rotation of the spherical wheel (also shown in FIG. 6A). In some implementations, in the first state, an inner periphery (or portion(s) thereof) of the brake ring is in contact with the outer surface of the spherical wheel. FIG. 5 (described below) shows the brake mechanism 400 in a second position or second state, e.g., a disengaged position in which the brake mechanism applies a lesser amount (or no amount) of friction that opposes rotation of the spherical wheel. In some implementations, in the second state, the inner periphery (or portion(s) thereof) of the brake ring is spaced apart from the outer surface of the spherical wheel, e.g., there is no contact between the inner periphery and the surface of the spherical wheel.

Spherical wheel 304 can be positioned relative to base 302 similarly as described above for FIG. 3. In the example views of FIGS. 4 and 5, the ball transfer units 306, 308, and 310 and the drive mechanisms 330 and 331 are not shown for clarity.

As shown in FIG. 4, brake ring 350 can be positioned on the opposite side of spherical wheel 304 to the base 302 as described for FIG. 3. In some implementations, as shown in FIG. 4, the spherical wheel has a center and an axis 403 (e.g., a vertical axis) extends through the center of the spherical wheel. Axis 304 can be perpendicular to a ground surface 414 on which the spherical wheel is positioned in some implementations, and/or perpendicular to a bottom surface of the base 302 in some implementations. In the example shown, the brake ring 350 is positioned in a plane perpendicular to the axis 403.

The brake ring 350 engages the surface of the spherical wheel 304 on a first hemispherical portion of the spherical wheel that is below plane 402 that extends through the center of the spherical wheel 304 and is parallel to ground surface 414 and/or the base 302. The brake ring 350 is positioned on the opposite side of plane 402 to a second hemispherical portion of the spherical wheel 304 closer to the base 302 than the first hemispherical portion.

In the described implementation, brake ring 350 is connected to the base 302 by brake ring connection members (e.g., guide rails) 404. For example, three connection members 404a, 404b, and 404c (generically referred to as 404) extend parallel to each other from the base 302 and are connected to the brake ring 350 in this example. Different numbers of connection members 404 can be provided in other implementations (e.g., two, four, etc.). Each connection member is translatable in directions toward and away from the base 302, e.g., a direction on an axis perpendicular to the base 302 or perpendicular to a ground surface on which the spherical wheel is positioned.

Each connection member 404 is connected to a respective plunger unit 406. For example, connection member 404a is connected to plunger unit 406a, connection member 404b is connected to plunger unit 406b, and connection member 404c is connected to plunger unit 406c (the plunger units being generically referred to as 406). Each plunger unit 406 includes a housing through which the associated connection member 404 extends. A bushing within each associated housing 410 allows the associated connection member 404 to move as a plunger vertically through the housing 410. Housing 410 is coupled to the base 302, and can be cylindrical in some implementations. In this example, each connection member 404 is configured to move along its axis 412 perpendicular to plane 402, e.g., a vertical direction up or down with respect to ground surface 414. Each housing 410 constrains its connection member 404 to movement along the axis 412.

The first ends of the connection members 404 are coupled to the brake ring 350. A second end of each connection member 404 is coupled to a first end of an associated linkage 418. The second end of each connection member 404 is rotatably coupled to the first end of the associated linkage 418 to allow these members to rotate with respect to each other at the connecting ends. In some example implementations as shown, ball end adjustment screws 416 can be provided, which include spring loaded ball ends connecting to the connection members 404 that allow the screws 416 (and linkages 418 connected to the screws 416) to rotate with respect to the connection members 404. This allows the relative motion of connection member 404 and linkage 418 while maintaining contact force strictly normal to the head (second end) of connection member 404. Other types of rotary couplings can be used to connect linkage 418 and connection member 404 in other implementations.

Each linkage 418 is rotatably coupled at a second end to a central member 420. Central member 420 is connected to a moving portion (e.g., plunger or armature) of a linear actuator 422, where the non-moving portion of actuator 422 is coupled to the base 302. The moving portion of the actuator moves linearly along an axis 423 extending through the actuator 422 that is parallel to the axes 412, which moves the central member 420 along the axis 423. In some implementations, the actuator 422 is a solenoid, and the moving portion of the actuator 422 is caused to move based on a current induced in a coil in the solenoid. Other types of actuators can be used in other implementations for actuator 422, e.g., linear motors, voice coils, etc. In another example, a hydraulic mechanism for the brake mechanism can include a master cylinder 422 with housings 406 as slave cylinders that each guide linear movement of a plunger that is a head of the associated connection member 404 and that is rotatably connected to linkage 418.

Each linkage 418 is also rotatably coupled to an actuator link 426, where the actuator link 426 is rigidly coupled to the actuator 422. Actuator link 426 provides a pivot point for the linkage 418 near the first end of the linkage 418.

In some implementations, the axis 423 of the actuator 422 is coincident with an axis (e.g., vertical axis) extending through the center of the spherical wheel 304 that is perpendicular to the ground surface 414 (and/perpendicular to the bottom surface of the base 302 in some implementations). In other implementations, the axis 423 can be offset from this axis of the spherical wheel.

In operation, as shown in FIGS. 4 and 5, the actuator 422 is controlled via control signals (e.g., from a control system 120 shown in FIG. 1) to output a force along its linear axis 423, which causes the central portion 420 to move along axis 423. In this example, the brake mechanism 400 is shown in FIG. 4 in an engaged position in which the brake mechanism applies a first amount, e.g., a greater amount, of friction to the spherical wheel that opposes rotation of the spherical wheel. The brake ring 350 is at a position in the vertical direction (e.g., perpendicular to plane 402) that is closer to the base 302 than a position of the brake ring 350 at a disengaged position of the brake mechanism 400. This engaged position causes one or more contact edges (e.g., engagement edges) of the brake ring 350 to contact the surface of spherical wheel 304 to cause friction that resists rotation of the spherical wheel. As shown, the linkages 418 are in approximate horizontal orientations, e.g., orientations that are approximately parallel to the plane 402.

In this example, the engaged position can be an actively commanded position based on received control signals, and can also be a normal or default state of the brake mechanism 400 occurring when, e.g., control signals are not sent to the actuator 422 and/or power is not supplied to the actuator 422 to output forces. Thus, the default position of the brake mechanism is a state of holding the spherical wheel in place, e.g., to make the load carried by the wheel drive mechanism 100 stationary with respect to the ground surface 414.

FIG. 5 shows the brake mechanism 400 in the second position, e.g., a disengaged position in which the brake mechanism applies a second amount of friction, e.g., a lesser amount of friction than the first amount, to the spherical wheel than the engaged position, or no amount of friction. In the second position of FIG. 5, the brake ring 350 has been moved to a lower position, e.g., a position in a direction toward ground surface 414 and perpendicular to plane 402, which is a position further from the base 302 than the position of the brake ring 350 at the engaged position of FIG. 4. In some implementations, the second position provides some friction to the spherical wheel, e.g., less friction than the first amount of friction provided in the first position. In some implementations, the second position provides no friction, e.g., the brake ring does not contact the spherical wheel at any locations of the spherical wheel and brake ring.

To move the brake ring 350 to the disengaged position, the actuator 422 is controlled via control signals to move the central member 420 in a direction 502 away from the base 302 along the axis 423 of the actuator 422 (e.g., vertical axis with reference to FIGS. 4 and 5). The movement of the central portion 420 causes the second ends of all of the linkages 418 to move in the same direction as the central portion 420, which causes the linkages 418 to pivot at their rotary couplings with the actuator links 426 closer to the first ends of linkages 418. This pivoting causes the first ends of linkages 418 to move about the pivot point, which includes movement in the direction 504 that is opposite to the direction 502 of the movement of the central member 420.

Movement of the first ends of linkages 418 in direction 504 causes the connection members 404 to move in the direction 504 along axes 412, which in turn causes brake ring 350 to move in direction 504 away from the surface of spherical wheel 304.

In some implementations, heads 506 of connection members 404 receive the ball end adjustment screws 416, and springs 508 are positioned between the respective heads 506 and housings 410. The springs 508 preload the connection members 404 such that heads 506 are further from base 302, to set the brake ring 350 in a default engaged state against the spherical wheel 304. The ball end set screws 416 held by linkages 418 depress the heads 506 and compress the springs 508 as the connection members 404 move in direction 504. The springs 508 can be selected to provide a desired clamping force of the brake ring 350 on the spherical wheel 304 when engaged (as in FIG. 4), and to allow adequate clearance of the brake ring 350 from the spherical wheel 304 to occur (as in FIG. 5) before full compression of the spring 508 to its solid height when all the coils of spring 508 are compressed against each other.

Thus, the brake ring 350 is positioned in a plane perpendicular to the axis 403 of the spherical wheel 350 in both the first (engaged) and second (disengaged) positions (states of the brake mechanism). In some examples, the connection members 404 maintain the brake ring 350 in the plane perpendicular to the axis 403 as the brake ring moves between the first and second positions.

The implementations described above that use a single actuator 422 and a linkage mechanism to move multiple connection members 404 and the brake ring 350 have certain advantages. For example, a single actuator 422 can be controlled with control signals and the linkage mechanism automatically coordinates the movement of all of the plungers 408 to be in the same direction with the same magnitude, causing the brake ring 350 to be moved without changing its orientation, e.g., maintaining an orientation perpendicular to the vertical axis 403 of the spherical wheel 304 (and, for example, parallel with ground surface 414). This allows the brake ring 350 to be moved without potentially changing its engagement properties with the spherical wheel 304 if the movement of the connection members 404 is not synchronized.

In some implementations, a respective actuator can be provided at the positions of the plungers 406 instead of (or in addition to) providing the actuator 422. For example, each such actuator can have a linearly moving portion that is coupled to a connection member 404. Such an actuator can be individually controlled by control signals to linearly move the attached connection member 404 along the associated axis 412. The actuators can be synchronized with control signals to each output the same amount of force/movement to cause all of the connection members 404 to move the same distance, which in turn maintains the orientation of the brake ring 350 during its movement and at its resulting position.

In some implementations, a single disengaged position is provided, e.g., the brake ring 350 is moved a predetermined distance in direction 504 to disengage from the spherical wheel when disengagement is commanded. In other implementations, the brake ring 350 can be moved to any of multiple positions at different distances from spherical wheel 304 and base 302, e.g., to allow different magnitudes of friction to the spherical wheel by the brake ring 350 and thus different amounts of disengagement of the brake ring 350 from the spherical wheel. For example, brake ring 350 can be moved to one or more intermediate positions between full engagement (the most friction applied by the brake ring by the brake mechanism 400) and full disengagement (full release and no friction applied by the brake ring).

In some implementations, brake mechanism 400 can be configured to allow a manual disengagement (e.g., release) of brake ring 350 from spherical wheel 304. For example, the manual disengagement can be based on a mechanical control that can be manipulated directly by a user. In some examples, a cable or a lever can be coupled to the central member 420 to allow a user to manually pull the central member 420 in direction 502, thus moving the linkages 418 to cause the brake ring 350 to move down in direction 504 and release the spherical wheel from a default braked state.

Figure 6A:
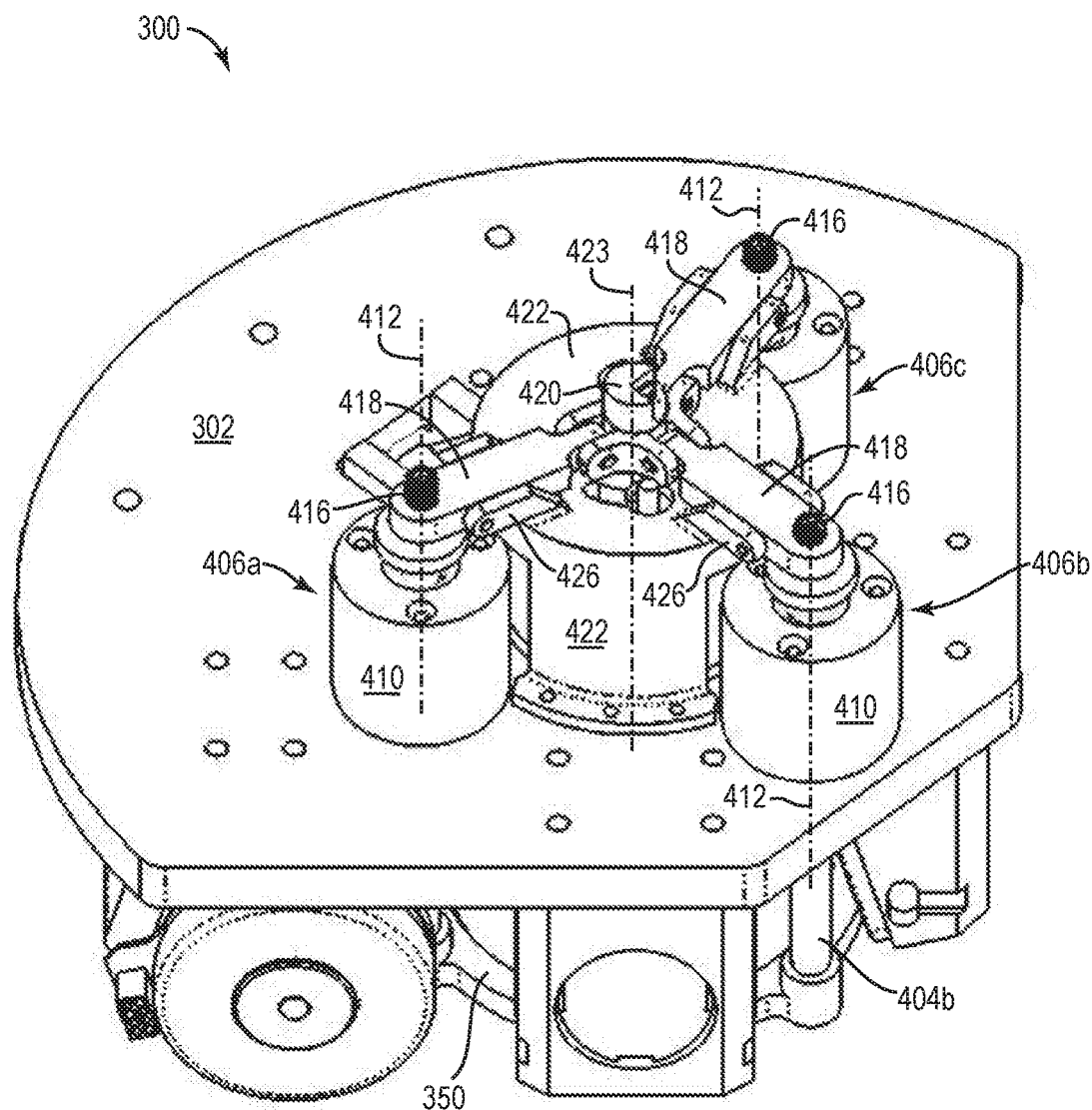
FIG. 6A is a perspective view of an example wheel module of FIG. 3 including a brake mechanism, according to some implementations.

FIG. 6A is a perspective view of an example wheel module 300. FIG. 6A shows the brake mechanism 400 in the example engaged position as described above with reference to FIG. 4.

Figure 6B:
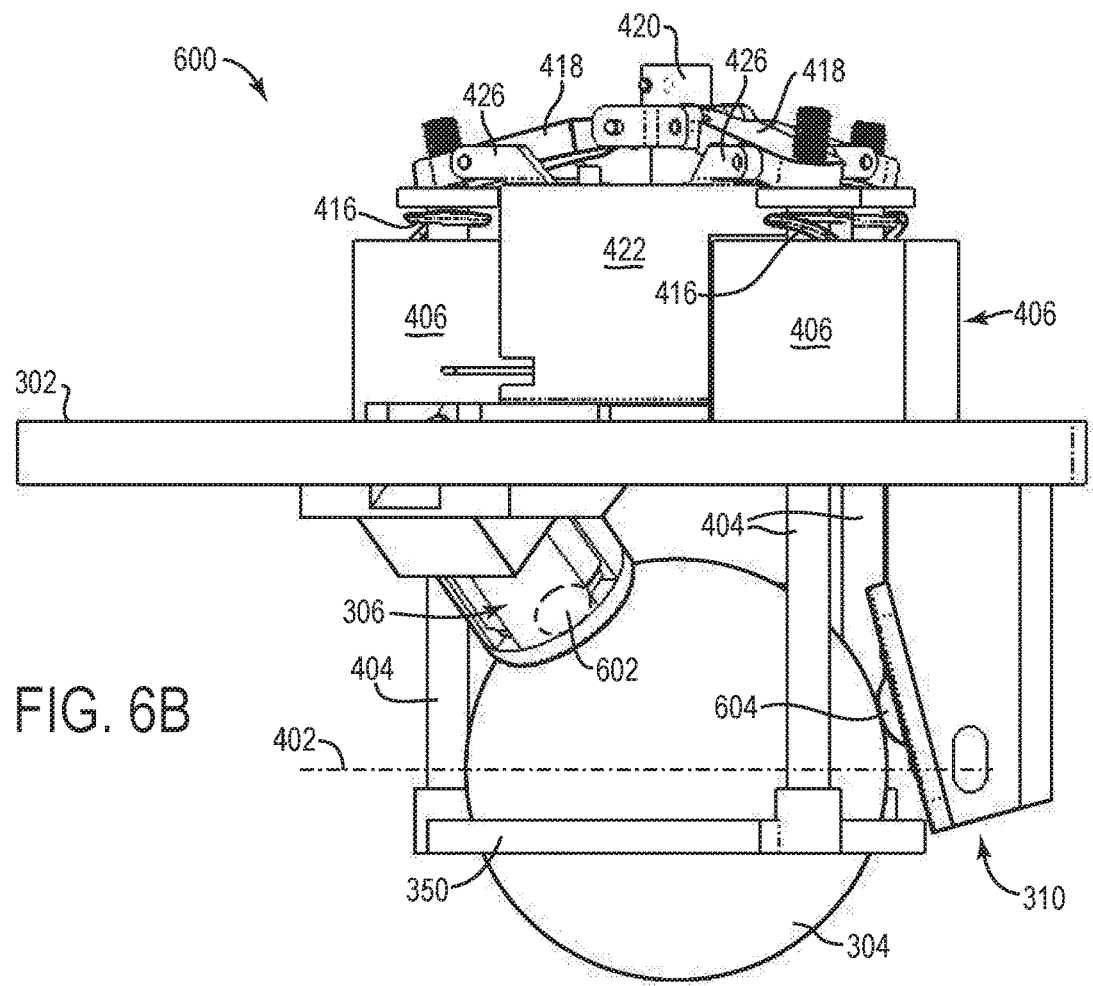
FIG. 6B is a side elevation view of an example portion of the wheel module of FIG. 3, according to some implementations.

FIG. 6B is a side elevation view of an example portion 600 of the wheel module 300 of FIG. 3. The drive mechanisms 330 and 331 are not shown in FIG. 6B for clarity. In this example, ball transfer units 306 and 310 are shown with respect to the brake mechanism 400 shown in FIGS. 4 and 5. For example, ball transfer units 306 and 310 are positioned to contact spherical wheel 304 above the plane 402 extending through the center of the spherical wheel 304, e.g., at a hemispherical portion of the spherical wheel on one side of plane 402 that is closer to base 302. In this example, ball transfer unit 306 is positioned such that a spherical ball 602 of the ball transfer unit 306 contacts the surface of spherical wheel 304 at a position that is closer to the base 302 than a position at which a spherical ball 604 of ball transfer unit 310 contacts the surface of spherical wheel 304.

Figure 8:
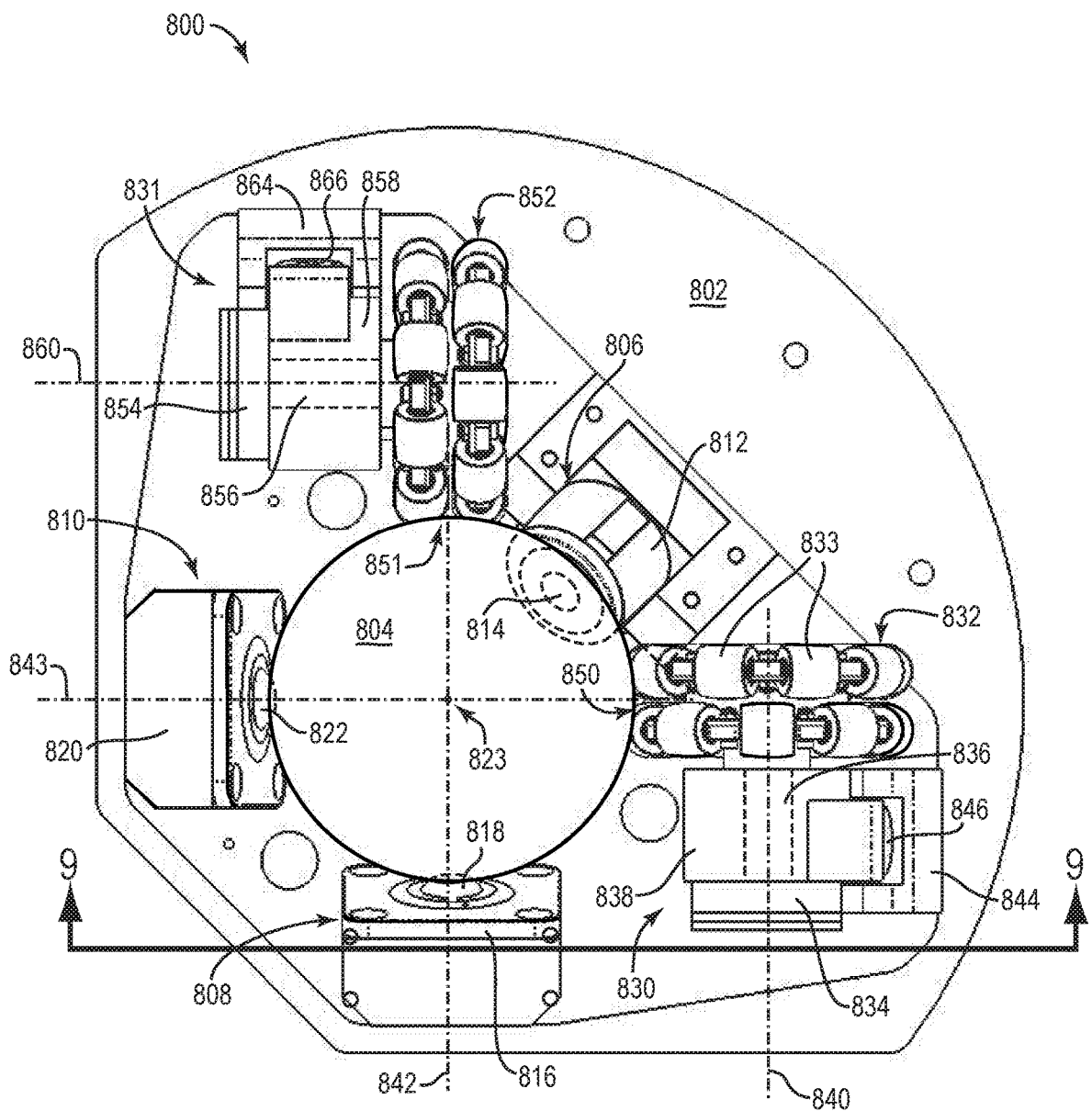
FIG. 8 is a bottom view of an example wheel module, according to some implementations.

A third ball transfer unit can be configured and positioned above plane 402 similarly to ball transfer unit 310 if two drive mechanisms are provided for the wheel module, e.g., as shown in FIGS. 3 and 8. In other implementations, a third ball transfer unit can be configured and positioned above plane 402 similarly to ball transfer unit 306 if one drive mechanism is provided for the wheel module.

Brake ring 350 and connection members 404 are positioned with respect to the base 302 so as to avoid interfering with the ball transfer units 306, 310, etc. For example, the connection members 404 can be spaced about the spherical wheel 304 between the ball transfer units.

Figure 7:
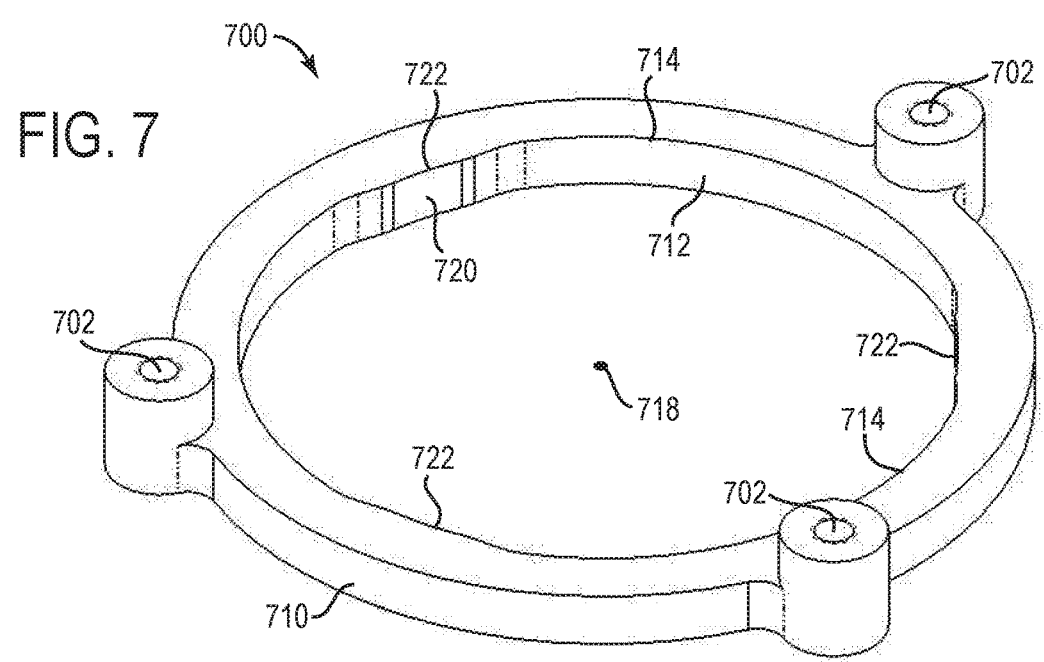
FIG. 7 is a perspective view of an example implementation of a brake ring, according to some implementations.

FIG. 7 is a perspective view of an example implementation 700 of a brake ring. For example, brake ring 700 can be used as brake ring 350 of FIGS. 3-6.

Example brake ring 700 includes multiple attachment points 702, which in this example are holes that receive screws or other fasteners of support members (e.g., connection members 404 of FIGS. 4 and 5). In this example, three attachment points 702 are provided in brake ring 700, although in other implementations a greater or less number of attachment points can be used.

Brake ring 700 includes an outer surface 710 on the outside of the brake ring and an inner surface 712 that is provided on the inside of the brake ring. A circular or curved inner edge 714 is provided along most of the circumference of the inner surface 712. At one or more locations around the inner edge, contact features 720 are provided. Three contact features 720 are shown in the example of FIG. 7, where the contact features are spaced around the center 718 of the brake ring. In some implementations, the contact edges 722 can be aligned vertically (e.g., along an axis parallel to axes 412 of FIGS. 4 and 5) with the balls of ball transfer units 306, 308, and 310. For example, three ball transfer units are aligned with three respective contact edges 722. In some implementations, the contact edges 722 can be spaced approximately equally around the circumference of inner surface 712.

Providing three contact features 702 allows that at least a portion of the three contact edges 722 are all within a single plane, which allows all of the contact edges 722 to contact the surface of the spherical wheel. In other implementations, other numbers of contact features and/or contact edges can be provided, e.g., two, four, etc.

Contact features 720 have a surface that extends a short distance toward the center 718 of the brake ring, thus providing contact edges 722 of the contact features 720 that are closer to the center 718 of the brake ring than the inner edge 714. In this example, contact features 720 are raised portions of the inner surface 712 that are formed as a unitary part of the brake ring 700. In some implementations, contact features 720 can be separate pieces attached to the inner surface.

The contact edges 722 can each have a particular length along the inner surface 712 that is relatively small compared to the inner circumference, e.g., the edges 722 occupy a small portion of the inner circumference of the brake ring. In some examples, each contact edge 722 can occupy about 10 to 20 degrees (for example, 15 degrees), or 2 to 6% (for example, about 4%) of the inner circumference of the brake ring; other sizes can be used in some implementations. In various implementations, the contact edges 722 each have the same length, or can have different lengths.

The contact edges 722 of the contact features 720 are configured to contact the surface of the spherical wheel, e.g., spherical wheel 304 of FIG. 3. Thus, a plurality of contact edges of the brake ring are spaced around the brake ring, where the contact edges are separated by non-contacting edges of the inner edge 714 positioned between the contact edges 722 around the inner circumference of the brake ring. For example, if the brake ring 700 is disengaged from the spherical wheel and is raised to contact the spherical wheel, the contact edges 722 will contact the spherical wheel first, before the curved inner edge 714. In other implementations, no contact features 720 are provided, and the inner edge 714 is used to contact the spherical wheel.

Providing contact edges 722 provides certain advantages. For example, an edge can provide greater friction to the spherical wheel than would a surface contacting the wheel, for a given amount of force. In addition, using three contact edges 722 spaced around the inner circumference of the brake ring can cause contact of those edges with the spherical wheel at particular locations, in contrast to using an entire single edge 714 of the brake ring (without contact features 720) that may have potentially unknown or variable points of contact with the spherical wheel due to variances in the brake ring structure from manufacturing tolerances, etc. Furthermore, aligning the contact edges 722 vertically with the ball transfer units 306, 308, and 310 can allow corresponding (e.g., vertically aligned) contact points to be provided on the top and bottom hemispheres of the spherical wheel 304, thus restraining the spherical wheel in its rotating space tightly at both hemispheres and allowing stronger and more rigid braking for the wheel system.

FIG. 8 is a bottom view of an example wheel module 800, according to some implementations. Wheel module 800 can be one or more wheel modules 102 of FIGS. 1 and 2, or the wheel module 300 of FIG. 3. In this example, a brake mechanism is not shown as part of wheel module 800 for clarity. A brake mechanism, such as brake mechanism 400 of FIGS. 4 and 5, can be included in wheel module 800 as illustrated in other figures herein.

Wheel module 800 includes a base 802 (e.g., chassis) and a spherical wheel 804, which, for example, can be implemented similarly as described in other implementations herein. Wheel module 800 includes rotary bearings provided between the base 802 and the spherical wheel 804, where the rotary bearings assist in constraining the spherical wheel 804 to roll within a rotating space (rolling space) defined by the rotary bearings, omni wheels, and/or brake ring described herein. In addition, the rotary bearings provide a path for the weight of a load carried by base 802 directly to the spherical wheel 804, e.g., the rotary bearings transfer most of the weight of the carried load from the base 802 to the spherical wheel 804.

In described implementations, the rotary bearings are ball transfer units 806, 808, and 810 that are directly coupled to base 802 and contact the surface of spherical wheel 804. Ball transfer unit 806 includes a restraining fixture 812 and a spherical ball 814, ball transfer unit 808 includes a restraining fixture 816 and a spherical ball 818, and ball transfer unit 810 includes a restraining fixture 820 and a spherical ball 822.

The ball transfer units 806, 808, and 810 are positioned at least partially over the spherical wheel 804, e.g., where the spherical balls 814, 818, and 822 contact the surface of the spherical wheel 804 on the base 802 side of an axis 843 that extends through the center of the spherical wheel 804 (e.g., see FIG. 8). For example, axis 843 can be parallel to the base 802 and ground surface on which the spherical wheel 804 rests. Gravity thus forces the ball transfer units in contact with the surface of the spherical wheel 804.

Each spherical ball 814, 818, and 822 contacts the surface of the spherical wheel 804 and transfers a portion of the load carried by the base 802 to the spherical wheel 804. Each spherical ball 814, 818, and 820 can be rolled omni-directionally within its restraining fixture. In some examples, each spherical ball 814, 818, and 820 can contact multiple ball bearings held within its restraining fixture to allow the omni-directional ball travel. The omni-directional travel of each spherical ball 814, 818, and 822 allow the spherical wheel 804 contacting the balls to be rotated in any direction without constraint from the ball transfer units 806, 808, and 810.

In some implementations, ball transfer units 806, 808, and 810 are spaced around the spherical wheel 804 approximately equally about the axis 823 (e.g., vertical axis) extending through a center of the spherical wheel 804 perpendicular to a ground surface or a plane of the bottom surface of the base 802. In some implementations, one or more of the ball transfer units 806, 808, and 810 can be adjusted in its position to allow space for other components, e.g., drive mechanisms 830 and 831 (described below).

Ball transfer units 806, 808, and 810 can be positioned at different heights and/or angles with respect to the spherical wheel 804, e.g., such that their spherical balls contact the spherical wheel 804 at different distances from the base 802 (and/or from the ground surface 106 which the spherical wheel 804 contacts opposite to the base 802). In this example, ball transfer units 806 and 808 are positioned such that their spherical balls 814 and 818 contact the surface of the spherical wheel 804 at positions closer to the base 802 than the position at which spherical ball 822 of ball transfer unit 810 contacts the spherical wheel 804. This is described in greater detail below with respect to FIG. 9.

First drive mechanism 830 and second drive mechanism 831 are coupled to the base 802. First drive mechanism 830 includes a first omni wheel 832 that is connected to a motor 834. In this example, the first omni wheel 832 contacts the surface of the spherical wheel 804 and is connected to a driven rotatable shaft 836 of the motor 834. Shaft 836 is rotatably coupled to a pivoting member 838 that is rotatably coupled to the base 802.

First omni wheel 832 is an omni wheel that, as referred to herein, includes a main wheel and multiple circumferential rollers (e.g., rollers 833) or discs that are positioned around the circumference of the main wheel, where the circumferential rollers each rotate about an individual axis of rotation that is approximately tangential to the main wheel and perpendicular to the axis of rotation of the main wheel (the axis of rotation of the main wheel is considered the axis of rotation of the omni wheel). The circumferential rollers are allowed to freely rotate about their individual axes. In other implementations, other types of wheel with individual or circumferential rollers can be used instead of omni wheel 832, e.g., a Mecanum wheel.

First omni wheel 832 contacts the spherical wheel 804 at a first contact position 850, There can be multiple locations at position 850, e.g., if two layers of circumferential rollers are used on the omni wheel as shown.

First omni wheel 832 rotates about axis 840 that extends parallel to the surface of base 802 and/or to the ground surface. When first omni wheel 832 is driven about axis 840, it rotates spherical wheel 804 via first contact position 850 about an axis 842 extending through the center of the spherical wheel 804 and parallel to axis 840. This provides a movement component to the wheel module 800 along axis 843 that is perpendicular to the axes 840 and 842 and provides this movement to the chassis and load carried by the wheel drive system of which wheel module 800 is a part. When spherical wheel 804 is rotated in a different direction than about axis 842, e.g., by second drive mechanism 831 and/or a different drive module of the connected wheel drive system, the freely-rotating circumferential rollers of the first omni wheel 832 permit this movement of the spherical wheel 804 with respect to the first omni wheel 832.

First omni wheel 832 can be biased against the surface of spherical wheel 804 by a spring force or other type of force. In this example implementation, pivoting member 838 that supports first omni wheel 832 is rotatably coupled to a support member 844 that is rigidly coupled to base 802. A spring 846 is coupled between the support member 844 and the pivoting member 838 and is in compression to provide a spring bias of the first omni wheel 832 against the surface of the spherical wheel 804. This bias provides greater traction between omni wheel 832 and spherical wheel 804, and reduces slippage between these components when rotating the omni wheel 832 using motor 834.

Second drive mechanism 831 includes a second omni wheel 852 that is connected to a second motor 854. In this example, the second omni wheel 852 contacts the surface of the spherical wheel 804 and is connected to a driven rotatable shaft 856 connected to the rotating shaft of the motor 854. The shaft 856 is supported by a pivoting member 858 that is coupled to the base 802. The second omni wheel 852 contacts the spherical wheel 804 at a second contact position 851 as shown. In this example, second contact position 851 is positioned at 90 degrees about the vertical axis 823 from the first contact position 850 of the first omni wheel 832.

Second omni wheel 852 rotates about axis 860 that is positioned parallel to the surface of base 802, where axis 860 is perpendicular to axis 840 of the first omni wheel 832. When second omni wheel 852 is driven about axis 860, it transfers force via second contact position 851 and rotates spherical wheel 804 about axis 843 extending through the center of the spherical wheel 804 that is perpendicular to axis 842. This provides a movement component to the wheel module 800 and carried load along axis 842 perpendicular to the axis 843. When the wheel module 800 is driven in a different direction than along axis 843, freely-rotating circumferential rollers of the second omni wheel 852 permit this movement of the spherical wheel 804 with respect to the second omni wheel 852.

Second omni wheel 852 can be biased against the surface of spherical wheel 804 by a spring force or other type of force. In this example implementation, pivoting member 858 that supports the second omni wheel 852 is rotatably coupled to a support member 864. A spring 866 is coupled between the support member 864 and the pivoting member 858 to provide a spring bias of the second omni wheel 852 against the surface of the spherical wheel 804, similarly as for first omni wheel 830.

Figure 9:
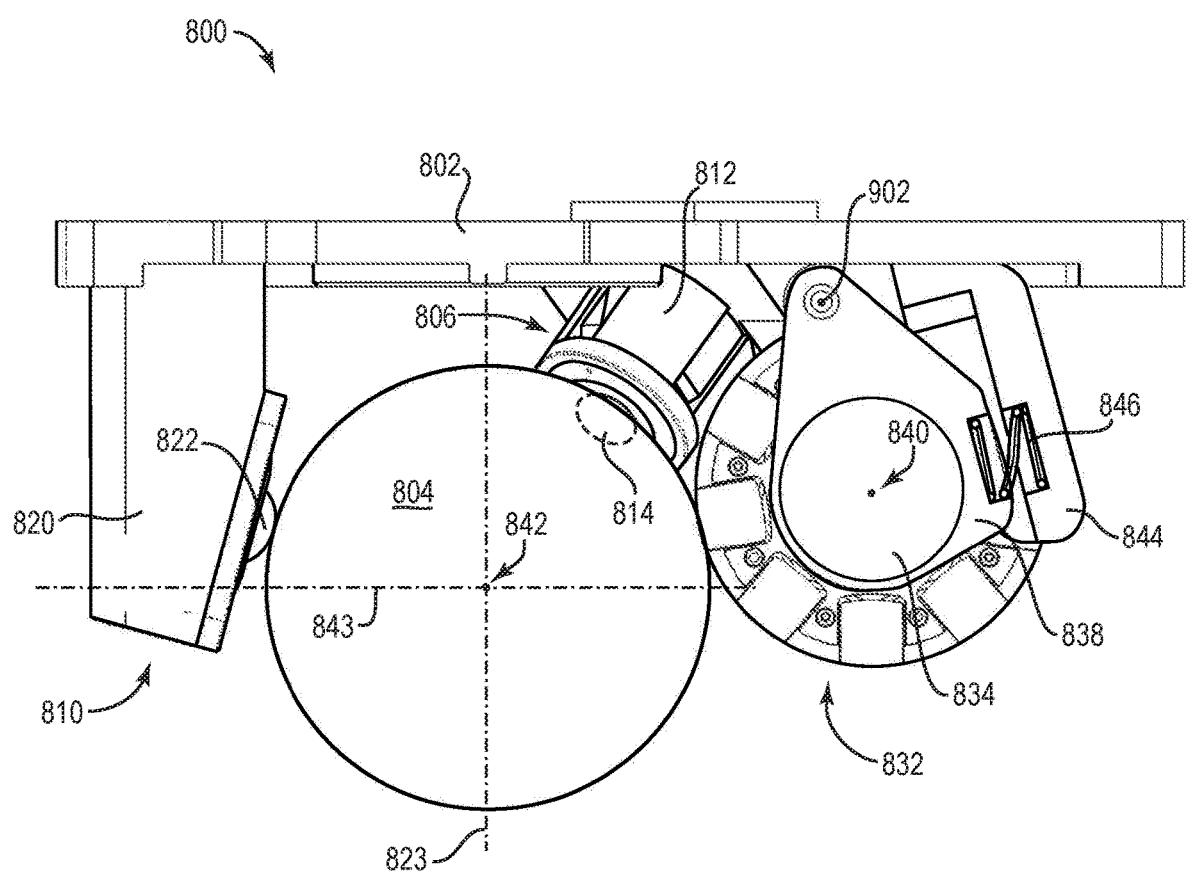
FIG. 9 is a cross-sectional side elevation view of the wheel module of FIG. 8, according to some implementations.

FIG. 9 is a cross-sectional side elevation view of the wheel module 800 of FIG. 8. In this example, the cross sectional view is based on line 9-9 of FIG. 8. In addition, ball transfer unit 808 and second drive mechanism 831 of FIG. 8 are not shown for clarity.

Ball transfer unit 806 is shown with spherical ball 814 contacting spherical wheel 804. Ball transfer unit 806 is positioned such that spherical ball 814 contacts the spherical wheel above a ground-parallel plane that includes axis 843 and is parallel to ground surface 106 (and to base 802 in some implementations). Axis 843 extends through the center of spherical wheel 804 parallel to the ground 106. Thus, ball 814 contacts spherical wheel 804 on the side of the ground-parallel plane of axis 843 nearest to base 802. Ball transfer unit 806 is positioned to transfer some of the vertical load carried by the rolling module 800 to spherical wheel 804. In this example, ball transfer unit 806 is angled to contact the spherical wheel 804 at a surface location that is approximately 45 degrees from the axis 843 toward the base 802. This allows the ball transfer unit 806 to support a greater maximum load on the base 802 than at a lower contact position closer to axis 843 (e.g., a greater load force, including a greater horizontal component of the load force, is seen at a lower position, such as that of ball transfer unit 410, for a given load).

Ball transfer unit 810 is also shown with its spherical ball 822 contacting spherical wheel 804. Ball transfer unit 810 is positioned such that the spherical ball 822 contacts the spherical wheel 804 at a position on the surface of the wheel 804 that is above the ground parallel plane that includes axis 843, e.g., on the side of the axis 843 plane that is closer to the base 802. Ball 822 contacts the spherical wheel at a position that is closer to the axis 843 than the contact position of the ball transfer unit 806, e.g., a lower position in the orientation of FIG. 9. Ball transfer unit 810 is located to position ball 822 at a lower position so that it more directly opposes the bias force (e.g., side load, preload force) applied by omni wheel 832 to spherical wheel 804 than it would at a contact position that is closer to base 802. The preload force applied by omni wheel 832 biases the spherical wheel 804 to move out of its rotating position, e.g., to potentially become misaligned with one or more of the ball transfer units 806, 808, and 810. Ball 822 of ball transfer unit 810 thus is positioned closer to the plane of axis 843 than ball 814 of ball transfer unit 806, to oppose this force and assist maintaining the spherical wheel 804 in an aligned position within its rotating space contacted by the ball transfer units.

In this example, ball transfer unit 808 (not shown in FIG. 9) is positioned similarly to ball transfer unit 810, e.g., such that the spherical ball 818 of the ball transfer unit 808 contacts the surface of the spherical wheel 804 further from the base 802, and closer to the ground-parallel plane of axis 843, than the ball 814 of the ball transfer unit 806. For example, the ball transfer unit 808 can be positioned at the same angle and distance from the base 802 as the ball transfer unit 810. Ball transfer unit 808 is positioned lower than ball transfer unit 806 so that it more directly opposes a force (side load) applied by second omni wheel 852 to spherical wheel 604 than it would at a contact position closer to base 602. This helps maintain the spherical wheel 804 in an aligned position within its rolling space contacted by the ball transfer units.

First omni wheel 832 contacts the spherical wheel 804 at one or more locations 850 of the spherical wheel. In this example, the contact location(s) are above the ground-parallel plane of axis 843, e.g., on the side of the plane that is closer to base 802. First omni wheel 832 is rotatably coupled to pivoting member 838, which is rotatably coupled to support member 844 by a coupling such that the pivoting member 838 is rotatable about axis 902. Support member 844 is rigidly coupled to the base 802, such that pivoting member 838 can pivot with respect to the support member 844. Spring 846 can be positioned in compression between pivoting member 838 and support member 844 and provides a force on pivoting member 838 toward the spherical wheel 804. This force pushes the first omni wheel 832 against the surface of the spherical wheel 804 to provide a stronger grip and reduce slippage between first omni wheel 832 and spherical wheel 804 when rotating the first omni wheel with motor 834.

Second omni wheel 852 (not shown in FIG. 9) is configured and operates similarly to the first omni wheel 832, to contact the spherical wheel 804 at a contact position 851 (see FIG. 8) about 90 degrees from the contact position of the first omni wheel 832 about the vertical axis 823 of the spherical wheel 804, using a preload force provided by spring 866 that is provided in compression between pivoting member 858 and support member 864, similarly as described above for first omni wheel 832.

In some implementations, other configurations can be used. For example, the ball transfer units can be positioned at other positions, and/or additional or fewer ball transfer units can be used to contact the spherical wheel 804. Ball transfer units 806, 808, and 810 can be positioned at different distances to the base 802 and at different spacings from each other around axis 823. In some implementations, the first omni wheel 832 and second omni wheel 852 can be spaced from each other at different positions or angles about axis 823 than shown in FIGS. 8 and 9.

In some implementations, a single drive mechanism 830 or 831 can be provided for wheel module 800, without the other drive mechanism 831 or 830. For example, each wheel module 102 can be driven in a single direction that is different than the other wheel modules 102 coupled to the chassis 104. Multiple wheel modules 102 can be driven to combine movement to a directed movement vector for the wheel system 100.

In an example implementation of wheel module 800 using a single drive mechanism 830 and no drive mechanism 831, the ball transfer unit 808 can be changed to be positioned at a closer distance from base 802 similar to ball transfer 806, because ball transfer unit 808 is not opposing a preload force applied by an opposing omni wheel. This allows ball transfer unit 808 to bear additional load and transmit additional load to the spherical wheel 804. Some example implementations of using a single drive mechanism for a spherical wheel mounting are described in copending U.S. patent application Ser. No. 16/191,301, entitled "Spherical Wheel Drive and Mounting," filed concurrently herewith, and which is incorporated herein by reference.

In some implementations, no drive mechanisms are provided in wheel module 800. For example, the wheel system 100 can be a passively-moved wheel system that can be moved by an externally applied force to the chassis 104 and/or one or more wheel modules 102, e.g., a person, moving object, vehicle, etc.

Figure 10:
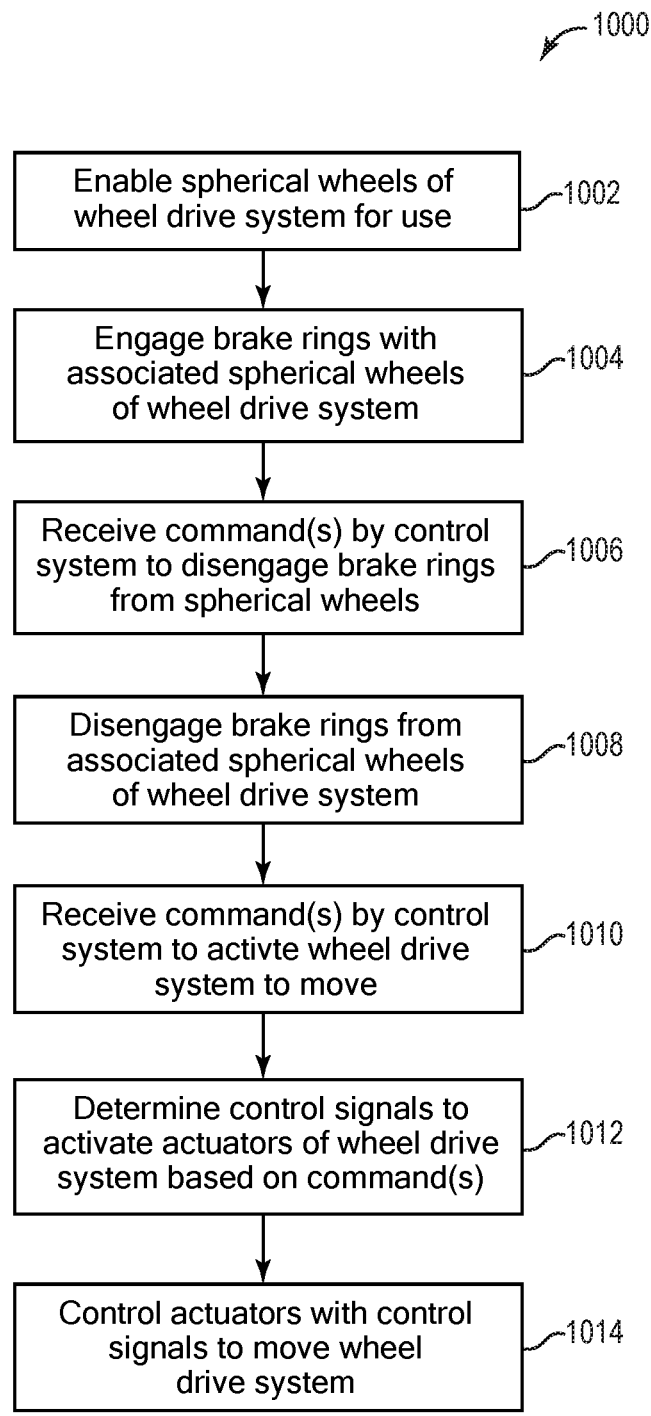
FIG. 10 is a flow diagram illustrating an example method to control a wheeled apparatus using spherical wheel mechanisms including brake mechanisms, according to some implementations.

FIG. 10 is a flow diagram illustrating an example method 1000 to control a wheeled apparatus using spherical wheel mechanisms including brake mechanisms, according to some implementations. Method 1000 can, for example, be used with various implementations of the wheel drive system 100 as described herein.

In block 1002, a one or more spherical wheels of a wheel drive system are provided and/or enabled for use. For example, as described above, the wheel drive system can be provided for a chassis that is or carries a load object. In some examples, the chassis can be a component or device of a medical system that performs a medical procedure. For example, the chassis can be part of a teleoperated surgical device that includes one or more surgical instruments that operate on a patient that is located next to the surgical device.

The wheel drive system can include one or more wheel modules as described above with respect to FIG. 1. For example, each such wheel module includes a brake system including brake mechanisms in one or more of the wheel modules as described herein. In some implementations, such wheel modules can constrain a spherical wheel to a rotating space relative to a base using one or more rotary bearings, and includes a drive mechanism to cause rotation of the spherical wheel within the rotating space as described herein.

In block 1004, brake rings are engaged with associated spherical wheels of the wheel drive system. For example, one or more wheel modules of the wheel drive system can each include a brake mechanism including a brake ring as described herein. An engaged brake ring is in a position to contact its associated spherical wheel to cause friction and resistance to rotation of the spherical wheel. In some implementations, the brake ring is engaged with the spherical wheel by default, e.g., in non-powered operation or an idle state of the wheel drive system. This causes the wheel system and carried load to be stationary by default, e.g., for safety and stability reasons.

In block 1006, one or more commands are received by a control system of the wheel drive system to disengage the engaged brake rings, e.g., release the brakes, on the spherical wheels. For example, the control system can be control system 120 as described above with respect to FIG. 1. In some examples, the commands can be received from a user that inputs the commands via a user interface and/or input device (e.g., touchscreen, keyboard, pointing device, etc.). In some implementations, the commands can be automatically generated by the control system based on one or more sensed conditions, e.g., an external force directing the wheel system and load to move (roll) is sensed by a force sensor and is above a particular threshold force. The control system can include one or more processors (e.g., microprocessors or other processing circuits) that receive the commands and determine control signals for the wheel drive system.

In block 1008, the brake rings are disengaged from the associated spherical wheels of the wheel drive system. This is performed in response to the commands received in block 1006. For example, the control system can provide braking control signals to an actuator 422 of each brake mechanism to control the actuator 422 to move the associated connection members 404 away from the base of the wheel module and move the brake ring away from the associated spherical wheel.

In block 1010, one or more commands are received, e.g., by a control system, to activate the wheel drive system to move. This control system can be the same control system 120 as controlling the brake mechanisms in some implementations. In some examples, the commands can be received from a user that inputs the commands via a user interface and/or input device. The control system can receive the commands and determine control signals for the wheel drive system.

In block 1012, the drive control signals to activate one or more actuators of the wheel drive system are determined based on the received commands. The drive control signals are provided to actuators to generate a movement vector from each driven wheel module. In some implementations, one motor is included for each spherical wheel, and at least two motors of different spherical wheels are controlled to provide movement vectors that are summed to determine the desired resulting direction of movement of the wheel system. In some implementations, two motors are included for each spherical wheel (e.g., in each wheel module) and can cause rotation of the spherical wheel in two directions, and the resulting direction of movement can be determined by summing the movement vector provided by each controlled motor of the spherical wheel.

In block 1014, actuators of the wheel drive system are controlled with the drive control signals determined in block 1012 to output forces on the spherical wheels to move the wheel drive system and its load. For example, drive control signals can be output to all of the wheel modules of the wheel drive system, or output to a subset of the wheel modules. The driven directions of the wheel modules combine into a resulting movement vector that has a magnitude and direction resulting from the sum of the individual movement vectors provided by the motors.

In some implementations, the control system can receive sensor signals and/or status signals indicating proximity of other objects to the wheel drive system (e.g., in the path of movement), status of components of the wheel drive system (e.g., blockage of spherical wheels, omni wheels, etc.). The control system can adjust the brake engagement control signals (e.g., to engage the brake rings) and/or adjust the drive motor control signals in response to such sensor and status signals.

In some implementations, a similar method can be used to stop motion of the wheel system. For example, drive control signals can cause the drive motors to stop outputting forces on the spherical wheels, and braking control signals can cause the brake rings of the brake mechanisms to engage the spherical wheels.

The blocks and operations described in the methods disclosed herein can be performed in a different order than shown and/or simultaneously (partially or completely) with other blocks and operations, where appropriate. Not all of the described blocks and operations need be performed in various implementations. In some implementations, blocks and operations can be performed multiple times, in a different order, and/or at different times in the methods.

The functional blocks, operations, features, methods, devices, and systems described in the present disclosure may be integrated or divided into different combinations of systems, devices, and functional blocks as would be known to those skilled in the art.

This description and the accompanying drawings that illustrate features and implementations should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure described features.

Further, this description's terminology is not intended to limit the scope of the claims. For example, spatially relative terms—such as "beneath", "below", "lower", "above", "upper", "proximal", "distal", and the like—may be used to describe one element's or feature's relationship to another element or feature as illustrated in the figures. These spatially relative terms are intended to encompass different positions (i.e., locations) and orientations (i.e., rotational placements) of a device in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. A device may be otherwise oriented (rotated 90 degrees or at other orientations) and the spatially relative descriptors used herein interpreted accordingly. Likewise, descriptions of movement along and around various axes includes various special device positions and orientations. In addition, the singular forms "a", "an", and "the" are intended to include the plural forms as well, unless the context indicates otherwise. Components described as coupled may be electrically or mechanically directly coupled, or they may be indirectly coupled via one or more intermediate components.

Elements described in detail with reference to one implementation may, whenever practical, be included in other implementations in which they are not specifically shown or described unless the one or more elements would make an implementation non-functional or provide conflicting functions. For example, if an element is described in detail with reference to one embodiment and is not described with reference to a second embodiment, the element may nevertheless be included in the second embodiment.

Although the present implementations have been described in accordance with the examples shown, one of ordinary skill in the art will readily recognize that there can be variations to the implementations and those variations would be within the scope of the present disclosure. Accordingly, many modifications may be made by one of ordinary skill in the art without departing from the scope of the appended claims.

What is claimed is:

1. A wheel mechanism, comprising:
a spherical wheel;
a base coupled to the spherical wheel via a rotary bearing that contacts a surface of the spherical wheel, wherein the rotary bearing is configured to allow the spherical wheel to rotate; and
a brake ring coupled to the base and configured to selectively engage and disengage the surface of the spherical wheel, wherein:
the brake ring, when engaged, contacts the spherical wheel at a plurality of locations of the brake ring spaced around a center of the brake ring; and
the brake ring provides friction that opposes rotation of the spherical wheel when engaged.

2. The wheel mechanism of claim 1, wherein the brake ring is configured to apply a greater amount of friction to the rotation of the spherical wheel when engaged than when disengaged.

3. The wheel mechanism of claim 1, wherein the brake ring is positioned to retain the spherical wheel in a space in proximity to the base, and wherein the brake ring is positioned on a side of the spherical wheel opposite to the base.

4. The wheel mechanism of claim 1, wherein the brake ring is engaged with the surface of the spherical wheel in an engaged position in which the brake ring applies a first friction to the rotation of the spherical wheel, and wherein the brake ring is disengaged with the surface of the spherical wheel in a disengaged position in which the brake ring applies no friction to the rotation of the spherical wheel.

5. The wheel mechanism of claim 1, wherein the brake ring is configured to contact the spherical wheel at a plurality of contact edge features of the brake ring spaced around the brake ring, and wherein the plurality of contact edge features are separated by non-contacting edges of the brake ring positioned between the plurality of contact edge features.

6. The wheel mechanism of claim 5, wherein the brake ring includes a toroid having a hole in a center of the brake ring in which the spherical wheel is positioned, and wherein the contact edge features are spaced from each other about an inner circumference of the brake ring.

7. The wheel mechanism of claim 1, wherein the brake ring is selectively engageable with the spherical wheel on a first hemispherical portion of the spherical wheel that is opposite to a second hemispherical portion of the spherical wheel contacted by the rotary bearing.

8. The wheel mechanism of claim 1, wherein the brake ring is configured to move from a disengaged position in a direction toward the base to engage the surface of the spherical wheel.

9. The wheel mechanism of claim 1, wherein the brake ring is configured to move in a direction perpendicular to a ground surface on which the spherical wheel is positioned.

10. The wheel mechanism of claim 1, further comprising at least one actuator coupled to the base and configured to move the brake ring with respect to the spherical wheel and to disengage the brake ring from the surface of the spherical wheel.

11. The wheel mechanism of claim 1, wherein the brake ring is coupled to the base by a plurality of connection members oriented in parallel and translatable to selectively engage and disengage the brake ring with the surface of the spherical wheel.

12. The wheel mechanism of claim 11, wherein an actuator is coupled to the base and is coupled to the connection members via a linkage, and wherein the actuator is configured to translate the connection members to cause the brake ring to engage and disengage the surface of the spherical wheel.

13. The wheel mechanism of claim 1, wherein the rotary bearing includes a ball provided in a ball transfer unit and rotatable with respect to the base, wherein the ball is configured to contact the surface of the spherical wheel during rotation of the spherical wheel on a ground surface.

14. The wheel mechanism of claim 1, wherein the rotary bearing is one of a plurality of rotary bearings, and wherein the base is coupled to the spherical wheel via the plurality of rotary bearings that contact the surface of the spherical wheel and that are configured to allow the spherical wheel to rotate.

15. The wheel mechanism of claim 1, further comprising:
an omni wheel coupled to the base and engaged with the surface of the spherical wheel; and
an actuator coupled to the base and to the omni wheel, wherein the actuator is configured to rotate the omni wheel to cause rotation of the spherical wheel.

16. A wheel system, comprising:
a chassis; and
a plurality of wheel modules coupled to the chassis, wherein one or more wheel modules of the plurality of wheel modules each include:
a spherical wheel;
a base coupled to the spherical wheel via a rotary bearing that contacts a surface of the spherical wheel, wherein the rotary bearing is configured to allow the spherical wheel to rotate; and
a brake ring coupled to the base, wherein the brake ring is configured to selectively engage and disengage the surface of the spherical wheel at a side of the spherical wheel opposite to the base, and wherein the brake ring provides a greater amount of friction to the rotation of the spherical wheel when engaged than when disengaged.

17. The wheel system of claim 16, wherein, in each of the one or more wheel modules, the brake ring is positioned to retain the spherical wheel in a space in proximity to the base.

18. The wheel system of claim 16, wherein, in each of the one or more wheel modules, the brake ring is configured to contact the spherical wheel at a plurality of contact edges of the brake ring spaced around the brake ring, and wherein the contact edges are separated by non-contacting edges of the brake ring positioned between the contact edges.

19. The wheel system of claim 16, wherein the brake ring engages the spherical wheel on a first hemispherical portion of the spherical wheel that is opposite to a second hemispherical portion of the spherical wheel engaged by the rotary bearing.

20. The wheel system of claim 16, wherein, in each of the one or more wheel modules, the brake ring is coupled to the base by one or more connection members translatable to selectively engage and disengage the brake ring with the surface of the spherical wheel, wherein an actuator is coupled to the base and is coupled to the one or more connection members via a linkage, and wherein the actuator is configured to translate the one or more connection members to cause the brake ring to engage and disengage the surface of the spherical wheel.

21. A method to control braking of a wheel mechanism, the method comprising:
   providing a spherical wheel supporting a chassis via a rotary bearing;
   engaging a brake ring with the spherical wheel on a first hemispherical portion of the spherical wheel that is opposite to a second hemispherical portion of the spherical wheel engaged by the rotary bearing, wherein engaging the brake ring causes friction to rotation of the spherical wheel; and
   disengaging the brake ring from the spherical wheel, reducing friction to the rotation of the spherical wheel.

22. The method of claim 21, wherein disengaging the brake ring from the spherical wheel includes translating the brake ring in a direction opposite to the chassis.

23. A wheel mechanism, comprising:
   a spherical wheel;
   a base coupled to the spherical wheel via a rotary bearing that contacts a surface of the spherical wheel, wherein the rotary bearing is configured to allow the spherical wheel to rotate;
   a brake ring coupled to the base and configured to selectively engage and disengage the surface of the spherical wheel, wherein the brake ring provides friction that opposes rotation of the spherical wheel when engaged; and
   at least one actuator coupled to the base and configured to move the brake ring with respect to the spherical wheel and to disengage the brake ring from the surface of the spherical wheel.

* * * * *